US012049088B2

(12) United States Patent
Nakamura et al.

(10) Patent No.: US 12,049,088 B2
(45) **Date of Patent: *Jul. 30, 2024**

(54) LIQUID EJECTING APPARATUS AND RECORDING SYSTEM

(71) Applicant: SEIKO EPSON CORPORATION, Tokyo (JP)

(72) Inventors: Hiroyuki Nakamura, Shiojiri (JP); Izumi Nozawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,211

(22) Filed: Apr. 26, 2023

(65) Prior Publication Data

US 2023/0256746 A1 Aug. 17, 2023

Related U.S. Application Data

(63) Continuation of application No. 17/237,237, filed on Apr. 22, 2021, now Pat. No. 11,712,899, which is a (Continued)

(30) Foreign Application Priority Data

Feb. 15, 2019 (JP) ................................ 2019-025250
Apr. 8, 2019 (JP) ................................ 2019-073321

(51) Int. Cl.
*B41J 2/175* (2006.01)
*B41J 2/165* (2006.01)
(Continued)

(52) U.S. Cl.
CPC ....... *B41J 2/17523* (2013.01); *B41J 2/16505* (2013.01); *B41J 2/1721* (2013.01); (Continued)

(58) Field of Classification Search
CPC . B41J 2/1721; B41J 2/175; B41J 29/02; B41J 13/009
See application file for complete search history.

(56) References Cited

U.S. PATENT DOCUMENTS 8,220,797 B2 7/2012 Yamamoto et al.
8,573,738 B2 11/2013 Yamamoto
(Continued)

FOREIGN PATENT DOCUMENTS

JP 2002-226110 A 8/2002
JP 2004-188629 8/2004
(Continued)

*Primary Examiner* — Sharon Polk
(74) *Attorney, Agent, or Firm* — WORKMAN NYDEGGER

(57) ABSTRACT

A liquid ejecting apparatus includes a transport unit that transports a medium along a transport path, a liquid ejecting head that performs recording on the transported medium by ejecting liquid from a nozzle formed at a nozzle surface, a mounting portion on which a liquid storage portion for storing the liquid supplied to the liquid ejecting head is mounted, and a first discharge port that delivers the medium on which the recording is performed toward a media processing apparatus that performs processing on the medium, in which the mounting portion is disposed at a position higher than the nozzle surface, and a first transport path which is a portion of the transport path from a position corresponding to the liquid ejecting head to the first discharge port passes above the mounting portion.

11 Claims, 16 Drawing Sheets

Related U.S. Application Data continuation of application No. 16/789,120, filed on Feb. 12, 2020, now Pat. No. 11,020,975.

(51) Int. Cl.
*B41J 2/17* (2006.01)
*B41J 29/02* (2006.01)

(52) U.S. Cl.
CPC .......... *B41J 2/175* (2013.01); *B41J 2/17596* (2013.01); *B41J 29/02* (2013.01)

(56) References Cited

U.S. PATENT DOCUMENTS

| | | | |
|---|---|---|---|
| 8,882,248 B2 | 11/2014 | Yamamoto | |
| 9,375,934 B2 | 6/2016 | Yamamoto | |
| 9,649,866 B2 | 5/2017 | Yamamoto | |
| 9,827,768 B2 | 11/2017 | Yamamoto | |
| 10,137,689 B2 | 11/2018 | Yamamoto | |
| 10,384,453 B2 | 8/2019 | Yamamoto | |
| 10,870,280 B2 | 12/2020 | Yamamoto | |
| 11,020,975 B2 * | 6/2021 | Nakamura | B41J 13/0036 |
| 11,345,153 B2 | 5/2022 | Yamamoto | |
| 11,577,515 B2 | 2/2023 | Yamamoto | |
| 11,618,258 B2 | 4/2023 | Yamamoto | |
| 11,878,529 B2 | 1/2024 | Yamamoto | |
| 2010/0078877 A1 | 4/2010 | Yamamoto et al. | |
| 2010/0079528 A1 | 4/2010 | Yamamoto | |
| 2013/0135390 A1 | 5/2013 | Yamamoto | |
| 2014/0036006 A1 | 2/2014 | Tamaki | |
| 2014/0099150 A1 | 4/2014 | Matsumoto et al. | |
| 2014/0104346 A1 | 4/2014 | Yamamoto | |
| 2015/0054896 A1 | 2/2015 | Yamamoto | |
| 2015/0165774 A1 | 6/2015 | Yamamoto | |
| 2016/0031221 A1 | 2/2016 | Fernando et al. | |
| 2016/0311238 A1 | 10/2016 | Yamamoto | |
| 2016/0375702 A1 | 12/2016 | Kobashi et al. | |
| 2017/0246870 A1 | 8/2017 | Yamamoto | |
| 2018/0079216 A1 | 3/2018 | Yamamoto | |
| 2018/0093505 A1 | 4/2018 | Hirata et al. | |
| 2019/0184708 A1 | 6/2019 | Yamamoto | |
| 2020/0171830 A1 | 6/2020 | Yamamoto | |
| 2021/0070051 A1 | 3/2021 | Yamamoto | |
| 2021/0394517 A1 | 12/2021 | Yamamoto | |
| 2022/0348018 A1 | 11/2022 | Yamamoto | |
| 2023/0158798 A1 | 5/2023 | Yamamoto | |

FOREIGN PATENT DOCUMENTS

| | | |
|---|---|---|
| JP | 2010-076907 | 8/2010 |
| JP | 2013-136241 | 7/2013 |
| JP | 2013-136241 A | 7/2013 |
| JP | 2016-203451 | 8/2016 |
| JP | 2016-175279 | 10/2016 |
| JP | 2017-009806 | 1/2017 |
| JP | 2017-009806 A | 1/2017 |
| JP | 2017-013240 | 1/2017 |
| JP | 6330429 B2 | 5/2018 |
| JP | 2018-187882 | 11/2018 |
| JP | 2018-196961 | 12/2018 |
| JP | 2018-196961 A | 12/2018 |

* cited by examiner

LIQUID EJECTING APPARATUS AND RECORDING SYSTEM

The present application is a continuation of U.S. patent application Ser. No. 17/237,237, filed Apr. 22, 2021, which is a continuation of U.S. patent application Ser. No. 16/789,120, filed Feb. 12, 2020, which is based on, and claims priority from JP Application Serial Number 2019-025250, filed Feb. 15, 2019 and JP Application Serial Number 2019-073321, filed Apr. 8, 2019, the disclosures of which are hereby incorporated by reference herein in their entirety.

BACKGROUND

1. Technical Field

The present disclosure relates to a liquid ejecting apparatus and a recording system.

2. Related Art

In the related art, for example, as disclosed in JP-A-2017-13240, a liquid ejecting apparatus is known which includes a liquid ejecting head which ejects liquid onto a medium, a mounting portion in which a liquid container that stores liquid supplied to the liquid ejecting head, and a transport device which transports the medium along a transport path.

In the liquid ejecting apparatus, the medium to which liquid has been applied by the liquid ejecting head is transported below the mounting portion. Therefore, when liquid from the mounting portion drips, the liquid adheres to the medium to which liquid has been applied, and thereby the image quality is degraded.

SUMMARY

According to an aspect of the disclosure, there is provided a liquid ejecting apparatus including a transport unit that transports a medium along a transport path, a liquid ejecting head that performs recording on the transported medium by ejecting liquid from a nozzle formed at a nozzle surface, a mounting portion on which a liquid storage portion that stores the liquid supplied to the liquid ejecting head is mounted, and a first discharge port for discharging the medium on which the recording is performed toward a media processing apparatus that performs processing on the medium, in which the mounting portion is disposed at a position higher than the nozzle surface, and the transport path has a first transport path provided from a position corresponding to the liquid ejecting head to the first discharge port, and the first transport path passes above the mounting portion.

According to another aspect of the disclosure, there is provided a recording system including a media processing apparatus that processes a medium, and a liquid ejecting apparatus including a transport unit that transports the medium along a transport path, a liquid ejecting head that performs recording on the transported medium by ejecting liquid from a nozzle formed at a nozzle surface, a mounting portion on which a liquid storage portion for storing the liquid supplied to the liquid ejecting head is mounted, and a first discharge port that delivers the medium on which the recording is performed toward the media processing apparatus, in which the mounting portion is disposed at a position higher than the nozzle surface, and a first transport path which is a portion of the transport path from a position corresponding to the liquid ejecting head to the first discharge port passes above the mounting portion.

DESCRIPTION OF EXEMPLARY EMBODIMENTS

Hereinafter, embodiments of the present disclosure will be described with reference to the drawings. In the following drawings, the scale of each member is illustrated different from the actual scale in order to make each member and the like recognizable.

1. First Embodiment

Figure 1:
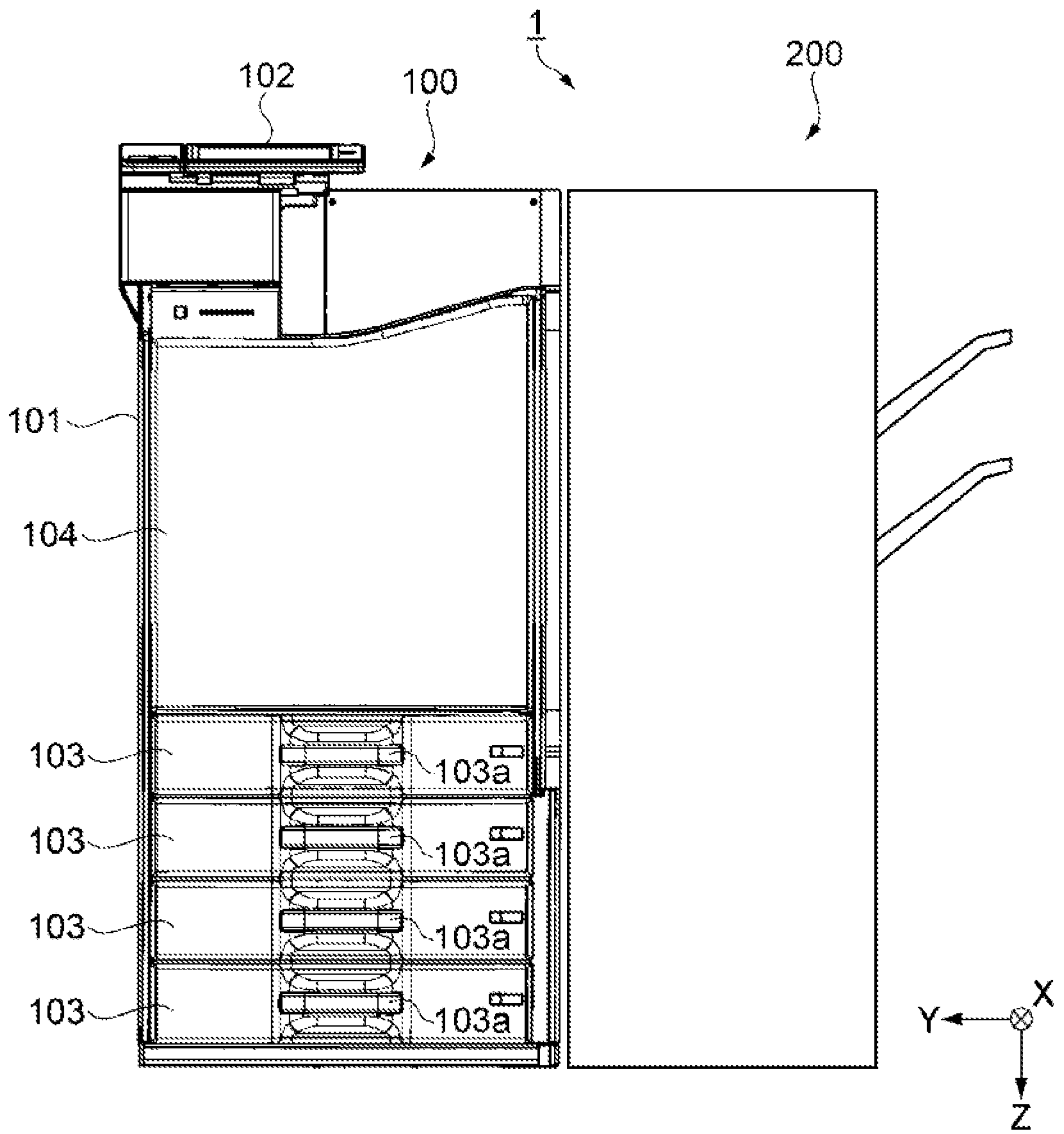
FIG. 1 is an external view illustrating the configuration of a recording system according to a first embodiment.

First, the configuration of a recording system 1 will be described. FIG. 1 is an external view illustrating the configuration of the recording system 1. As illustrated in FIG. 1, the recording system 1 includes a liquid ejecting apparatus 100 and a media processing apparatus 200. In addition, a control unit 2 (FIG. 2) that collectively controls driving of respective mechanisms in the recording system 1 is provided. The liquid ejecting apparatus 100 is, for example, an ink jet printer for recording an image such as letters, figures, and photos by adhering ink as an example of liquid to paper S as an example of a medium. The media processing apparatus 200 is disposed adjacent to the liquid ejecting apparatus 100. The media processing apparatus 200 is a post-processing apparatus that performs post-processing such as a stapler process of stapling paper S on which recording of an image is performed by the liquid ejecting apparatus 100, with a staple (needle).

As illustrated in FIG. 1, the liquid ejecting apparatus 100 has a housing 101. An operation unit 102 for performing various operations of the liquid ejecting apparatus 100 is attached to an upper portion of the housing 101.

Further, a cover 104 is provided which is capable of opening and closing a part of the housing 101 in the +Z direction of the operation unit 102. The cover 104 is provided to be pivotable about an end side portion of the cover 104 in the −Y direction as a base end. The cover 104 is configured to be freely pivotable between two positions, that is, an open position where a tip end side that is opposite to the base end is spaced apart from the liquid ejecting apparatus 100 and a closed position constituting a part of the housing 101.

Further, a paper cassette 103 as a medium storage portion for storing the paper S is provided in the +Z direction of the cover 104. In the present embodiment, four paper cassettes 103 are arranged side by side along the +Z direction of the cover 104. The paper S to be recorded by the liquid ejecting apparatus 100 is stored in the paper cassette 103 in a stacked state. Further, a gripping portion **103*a* that can be gripped by a user is provided in each paper cassette 103. The paper cassette 103 is configured to be attachable and detachable to and from the housing 101 by moving the gripping portion 103*a* in the −X direction and the X direction. The paper S stored in the respective paper cassettes 103** may be different types or may be the same type.

Figure 2:
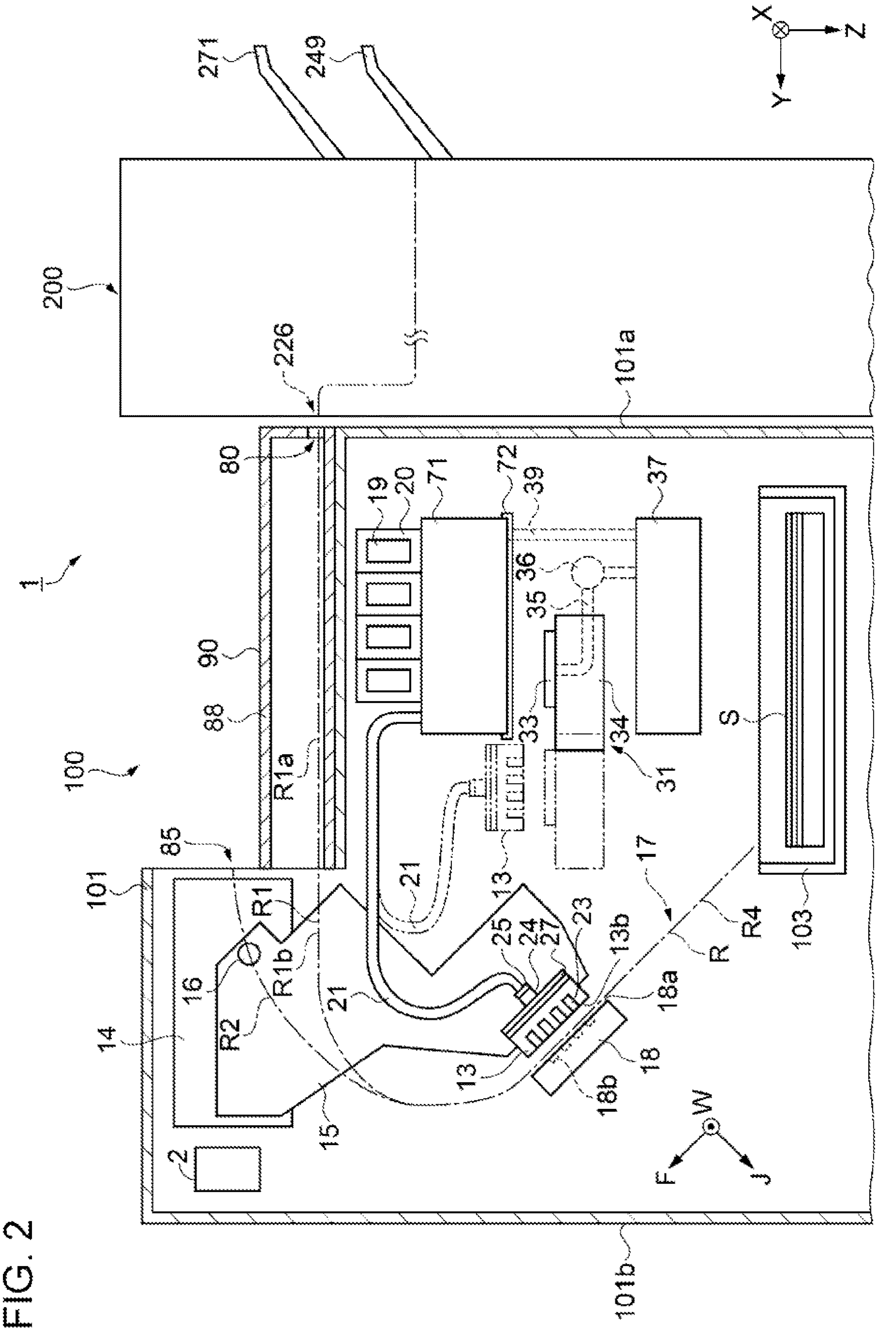
FIG. 2 is a schematic view illustrating the configuration of a liquid ejecting apparatus according to the first embodiment.

Next, the configuration of the liquid ejecting apparatus 100 will be described. FIG. 2 is a schematic view illustrating the configuration of the liquid ejecting apparatus 100. As illustrated in FIG. 2, the liquid ejecting apparatus 100 includes the housing 101, a liquid ejecting head 13 that ejects the liquid in the housing 101, a maintenance unit 31 that performs maintenance of the liquid ejecting head 13, a displacement mechanism 14 that displaces the liquid ejecting head 13, the paper cassette 103 that stores a plurality of paper S, and a medium support unit 18 that supports the paper S transported from the paper cassette 103. Further, a transport unit 17 that transports the paper S along a transport path R (one dot chain line in FIG. 2) is provided. The transport unit 17 is configured of a plurality of transport roller pairs driven by a driving motor (not illustrated). The paper S discharged from the paper cassette 103 is transported to the media processing apparatus 200 along the transport path R by the transport unit 17. Alternatively, the paper S is discharged from a second discharge port 85. The detailed configuration of the transport path R will be described later. The control unit 2 controls a moving mechanism 34 that moves the maintenance unit 31 in the +Y direction or the −Y direction, the liquid ejecting head 13, the displacement mechanism 14, the maintenance unit 31, the driving motor of the transport unit 17, and the like.

A mounting portion 20 on which one or a plurality of liquid storage portions 19 for storing liquid supplied to the liquid ejecting head 13 is provided inside the housing 101. Four liquid storage portions 19 are provided in the present embodiment. The liquid storage portion 19 may be a cartridge attachable and detachable to and from the mounting portion 20 or may be a tank into which liquid can be filled. The mounting portion 20 is disposed at a position higher than a nozzle surface **13*b* of the liquid ejecting head 13. That is, the mounting portion 20 is disposed at a position shifted from the nozzle surface 13*b* of the liquid ejecting head 13 in the −Z direction. Accordingly, liquid can be easily pressurized and supplied to the liquid ejecting head 13**.

The liquid ejecting apparatus 100 includes a liquid supply channel 21 that supplies liquid to the liquid ejecting head 13 and a pressure adjustment mechanism 24 provided at the liquid supply channel 21. A filter 25 that filters the liquid flowing into the pressure adjustment mechanism 24 and a filter 27 that filters the liquid flowing out from the pressure adjustment mechanism 24 are disposed at the liquid supply channel 21.

The liquid ejecting apparatus 100 includes a reservoir 71 that communicates with the liquid storage portion 19 and the liquid ejecting head 13 and is capable of temporarily storing the liquid flowing from the liquid storage portion 19. The reservoir 71 is disposed at a position higher than the nozzle surface **13*b* on which a nozzle 23 of the liquid ejecting head 13 is formed and is disposed at a position lower than the mounting portion 20. Accordingly, liquid can be pressurized and supplied to the liquid ejecting head 13 by the water head difference between the reservoir 71 and the nozzle 23. That is, liquid can be supplied to the liquid ejecting head 13 by the water head difference without depending on the driving power of a pressurizing mechanism or the like that pressurizes the liquid in the liquid storage portion 19**, for example.

The displacement mechanism 14 includes a holding member 15 that holds the liquid ejecting head 13. The displacement mechanism 14 changes the posture of the liquid ejecting head 13 between a first posture indicated by a solid line in FIG. 2 and a second posture indicated by a two-dot chained line in FIG. 2 by causing the holding member 15 to pivot around a pivot shaft 16. The displacement mechanism 14 may include a mechanism that moves the liquid ejecting head 13 in the second posture state in the +Z direction. The liquid ejecting head 13 has a plurality of nozzles 23 that ejects liquid toward the paper S and the nozzle surface **13*b* on which the nozzles 23 are formed. In a case where the liquid ejecting head 13 ejects a plurality of different types of liquids, at least the nozzle 23, the liquid supply channel 21, and the pressure adjustment mechanism 24** are provided for respective types of liquids.

The first posture is, for example, a posture in which the nozzle surface **13*b* of the liquid ejecting head 13 is inclined with respect to horizontal, and the second posture is a posture in which the inclination of the nozzle surface 13*b* with respect to horizontal is smaller than that of the first posture. In the present embodiment, when the liquid ejecting head 13 is in the second posture, the nozzle surface 13*b* is horizontal. However, the nozzle surface 13*b* needs not to be horizontal, but may be closer to horizontal than the first posture. That is, "the inclination of the nozzle surface 13*b* with respect to horizontal is smaller than that of the first posture" includes a case where the inclination of the nozzle surface 13*b* with respect to horizontal is zero and the nozzle surface 13*b*** is horizontal.

The liquid ejecting head 13 performs recording by ejecting liquid as droplets onto the paper S supported by the medium support unit 18 disposed opposite to the nozzle surface 13*b* when the liquid ejecting head 13 is in the first posture. In the present embodiment, a direction in which the paper S advances on the medium support unit 18 is defined as a transport direction F, and a direction in which the liquid ejecting head 13 in the first posture ejects liquid is defined as an ejecting direction J. Further, a direction different from both the transport direction F and the ejecting direction J is defined as a width direction W. The liquid ejecting head 13 of the present embodiment constitutes a line head having a plurality of nozzles 23 arranged such that a printing range in the width direction W is greater than or equal to a width of the paper S.

Next, the configuration of the maintenance unit 31 will be illustrated.

The maintenance unit 31 includes a cap 33 that receives the liquid discharged from the nozzle 23 of the nozzle surface 13*b* in accordance with movement relative to the liquid ejecting head 13 and a suction mechanism 36 that sucks the inside of the cap 33. The suction mechanism 36 is coupled to the cap 33 and a waste liquid storage portion 37 via a suction flow path 35.

The maintenance unit 31 is disposed below the reservoir 71. Accordingly, liquid can be pressurized and supplied to the liquid ejecting head 13, and the maintenance of the liquid ejecting head 13 can be easily performed.

The maintenance unit 31 performs maintenance operations including capping and cleaning when the liquid ejecting head 13 is in the second posture. The capping is performed when the cap 33 is located below the liquid ejecting head 13. When the capping is performed, the liquid ejecting head 13 moves downward and forms a closed space between the cap 33 and the nozzle surface 13*b*. A position of the maintenance unit 31 when the capping is performed is referred to as a capping position. The capping is performed to prevent the nozzle 23 from drying when the liquid ejecting head 13 stops a liquid ejecting operation as well as when the power is off.

When performing suction cleaning which is one type of cleaning, first, the liquid ejecting head 13 is moved downward by the displacement mechanism 14 to perform capping. When the suction mechanism 36 is driven in a state in which the cap 33 forms a closed space between the cap 33 and the nozzle surface 13*b*, foreign objects such as bubbles located in the liquid ejecting head 13 are discharged from the nozzle 23 along with the liquid.

The cleaning is performed when the cap 33 is located below the liquid ejecting head 13. The cleaning is performed before a printing process starts or after the printing process is performed.

Further, the liquid ejecting head 13 performs a maintenance operation such as flushing for ejecting and discharging liquid, for example, when a slight ejection failure occurs. When the liquid ejecting head 13 is in the second posture, the moving mechanism 34 may perform the flushing by moving the maintenance unit 31 into a receiving position and receive the liquid discharged due to the flushing by the cap 33. In this case, it is preferable that the liquid ejecting head 13 is not moved downward and is disposed at a position away from the cap 33. Further, the liquid received by the cap 33 is stored in the waste liquid storage portion 37 by the driving of the suction mechanism 36.

A rib 18*a* that supports paper S and a concave receiving portion 18*b* that is disposed around the rib 18*a* may be provided in the medium support unit 18 to perform flushing toward the receiving portion 18*b* when there is no paper S on the medium support unit 18. In this case, the liquid ejecting head 13 performs flushing in the first posture.

Providing the receiving portion 18*b* in the medium support unit 18 enables the liquid ejecting head 13 to perform flushing in the first posture without changing the posture between the transport of paper S and transport of the next paper S, for example, when a printing process on a plurality of paper S is performed in succession. Therefore, the time necessary for the maintenance operation can be reduced compared to a case where the posture of the liquid ejecting head 13 is changed to the second posture in the middle of the printing process and flushing is performed toward the cap 33. The liquid received in the receiving portion 18*b* may be received in the waste liquid storage portion 37 through a waste liquid tube (not illustrated) or the like.

Next, the layout of the transport path R and the like of the liquid ejecting apparatus 100 will be described.

A first discharge port 80 that delivers the paper S on which the recording is performed by the liquid ejecting head 13 toward a bring-in port 226 of the media processing apparatus 200 is provided at the upper end portion of the housing 101 in the −Y direction. The first discharge port 80 has an opening portion provided in the housing 101. The paper S on which recording is performed is delivered to the bring-in port 226 of the media processing apparatus 200 through the opening portion.

A first transport path R1 of the transport path R from a position corresponding to the liquid ejecting head 13 to the first discharge port 80 passes above the mounting portion 20. A position corresponding to the liquid ejecting head 13 refers to a position where the transport path R faces the nozzle surface 13*b* when the liquid ejecting head 13 is in the first posture. In more detail, the first transport path R1 turns around the side of the mounting portion 20 in the +Y direction and passes through a position shifted from the mounting portion 20 in the −Z direction. Therefore, for example, even when the liquid from the mounting portion 20 drips, the possibility of the dripping liquid adhering to the paper S on which recording is performed is reduced. Accordingly, the degradation of image quality can be suppressed.

Further, the liquid ejecting apparatus 100 has the second discharge port 85 that discharges the paper S on which recording is performed by the liquid ejecting head 13 from the housing 101 instead of delivering the paper S to the media processing apparatus 200. The second discharge port 85 is disposed at a position shifted from the first discharge port 80 in the −Z direction. The second discharge port 85 has an opening portion provided in the housing 101. The paper S on which recording is performed is discharged from the housing 101 to the outside through the opening portion.

The second discharge port 85 is provided adjacent to the first transport path R1 above the first transport path R1. A position corresponding to the liquid ejecting head 13 refers to a position where the transport path R faces the nozzle surface 13*b* when the liquid ejecting head 13 is in the first posture. In more detail, a second transport path R2 turns around the side of the mounting portion 20 in the +Y direction and passes through a position shifted from the mounting portion 20 in the −Z direction and shifted from the first transport path R1 in the −Z direction. Therefore, for example, even when the liquid from the mounting portion 20 drips, the possibility of the dripping liquid adhering to the paper S on which recording is performed is reduced. Accordingly, the degradation of image quality can be suppressed. Further, the first transport path R1 and the second transport path R2 are configured in common from the position corresponding to the liquid ejecting head 13 to the middle portion. Accordingly, a space for the transport path R can be saved.

The liquid ejecting apparatus 100 has a medium receiving portion 88 that receives the paper S discharged from the second discharge port 85. The medium receiving portion 88 has a plate shape and is disposed in the −Z direction of the first transport path R1. The first transport path R1 passes between the medium receiving portion 88 and the mounting portion 20. Accordingly, a space for a disposal area of the medium receiving portion 88 and the first transport path R1 can be saved.

Here, a unit transport path 90 in which the first discharge port 80 and a first connecting path Rla of the first transport path R1 as a connecting path coupled to the first discharge port 80 are integrated may be formed. The first connecting path Rla coupled to the first discharge port 80 of the unit transport path 90 is a portion of the first transport path R1 above the mounting portion 20 and is a portion corresponding to the second discharge port 85 from the first discharge port 80 in the +Y direction. The unit transport path 90 is configured to be attachable and detachable to and from a portion Rlb of the first transport path R1 excluding the first connecting path Rla. Therefore, when the unit transport path 90 is mounted on the housing 101, an end portion surface of the unit transport path 90 in the −Z direction functions as the medium receiving portion 88. On the other hand, when the unit transport path 90 is removed, the distance from the second discharge port 85 to the surface of the housing 101 below becomes longer, so that the capacity of the paper S discharged from the second discharge port 85 can be increased, and the convenience can be improved according to the application.

Further, in the +Y and −Y direction in FIG. 2 which is a width direction of the housing 101 in a side view of the housing 101, the first discharge port 80 is disposed on a first surface 101*a* side of the housing 101 facing the media processing apparatus 200, that is, on the −Y direction side as one side from the center of +Y and the −Y direction which is the width direction of the housing 101, and the liquid ejecting head 13 performs recording on the paper S at a position close to a second surface 101*b* facing the first surface 101*a*, that is, on the +Y direction side as the other side from the center of +Y and the −Y direction in the width direction of the housing 101. That is, the position at which the liquid ejecting head 13 performs recording on the paper S in the first posture and the position of the first discharge port 80 are opposite to each other. Accordingly, the distance that the paper S on which recording is performed is transported to the first discharge port 80 becomes longer, so that the time for drying the liquid applied to the paper S can be set longer. Therefore, it is possible to suppress curling of the paper S caused by undried paper S and a defect such as transfer caused by liquid on the paper S.

As illustrated in FIG. 2, in a side view of the housing 101 from the −X direction, the mounting portion 20, the reservoir 71, and the maintenance unit 31 are vertically disposed in an area surrounded by the paper cassette 103 disposed on the first surface 101*a* side below the liquid ejecting head 13, a fourth transport path R4 of the transport path R from the paper cassette 103 to a position corresponding to the liquid ejecting head 13, the first transport path R1 coupled to the fourth transport path R4, and the first surface 101*a* of the housing 101. A position corresponding to the liquid ejecting head 13 refers to a position where the transport path R faces the nozzle surface 13*b* when the liquid ejecting head 13 is in the first posture. Accordingly, an effective layout of the housing 101 can be achieved, and a space can be saved. Furthermore, the waste liquid storage portion 37 is also disposed in the above-described area. Accordingly, space efficiency can be further improved.

The waste liquid storage portion 37 can be attached and detached in a state in which the cover 104 (FIG. 1) is opened. The cover 104 is provided on a surface intersecting with a surface on which the first discharge port 80 is formed in the housing 101. That is, in FIG. 2, the first discharge port 80 is provided on the first surface 101*a* which is a surface of the housing 101 in the −Y direction, and the cover 104 is provided on a surface of the housing 101 in the −X direction. Therefore, the waste liquid storage portion 37 can be easily replaced even when the liquid ejecting apparatus 100 and the media processing apparatus 200 are arranged parallel to each other.

A liquid receiving portion 72 that can receive liquid is provided below the mounting portion 20, the reservoir 71, or the maintenance unit 31. In the present embodiment, the liquid receiving portion 72 is provided below the reservoir 71. The liquid receiving portion 72 has a plate shape and is disposed approximately horizontally. Accordingly, the liquid dripping from the reservoir 71 can be received reliably. Further, the liquid receiving portion 72 and the waste liquid storage portion 37 are coupled by a waste liquid flow path 39. The liquid received in the liquid receiving portion 72 flows into the waste liquid storage portion 37 through the waste liquid flow path 39. Accordingly, when liquid from the mounting portion 20 or the reservoir 71 leaks, it is possible to make the leaking liquid reliably flow into the waste liquid storage portion 37. The liquid receiving portion 72 may be disposed below each of the mounting portion 20, the reservoir 71, and the maintenance unit 31. Further, the disposal position of the liquid receiving portion 72 may appropriately be set.

Figure 3:
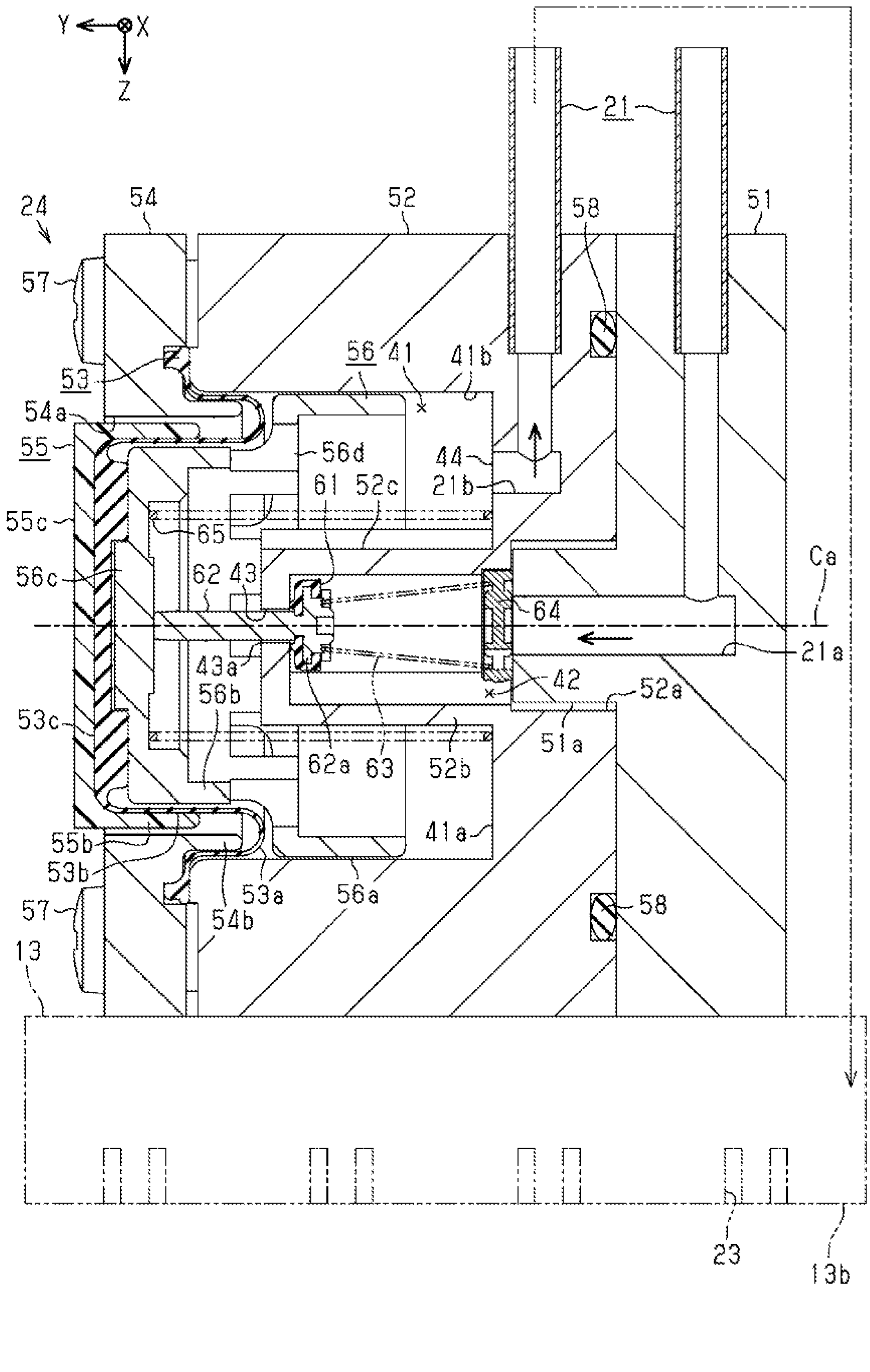
FIG. 3 is a sectional view illustrating the configuration of a pressure adjustment mechanism according to the first embodiment.
Figure 4:
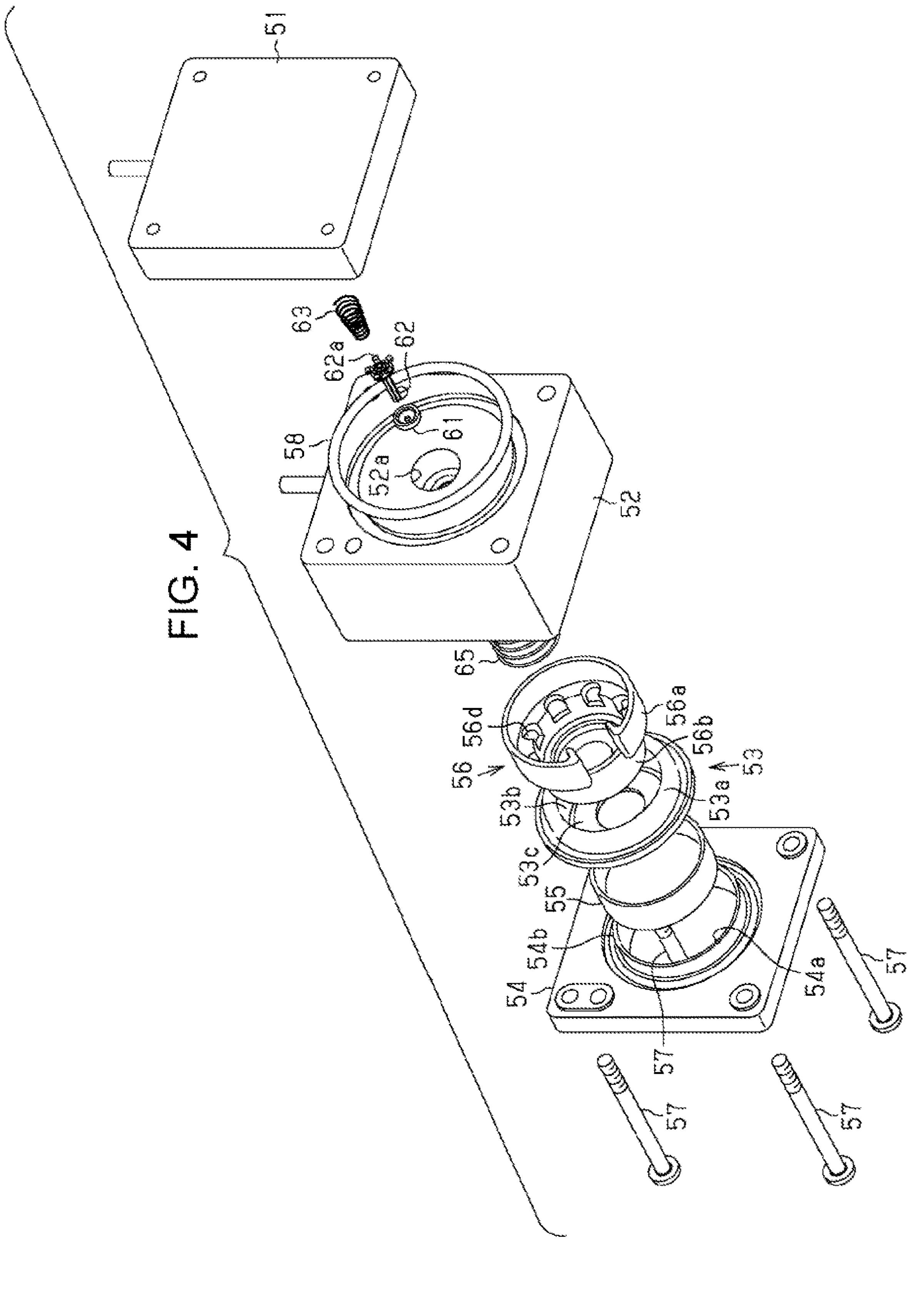
FIG. 4 is an exploded perspective view illustrating the configuration of the pressure adjustment mechanism according to the first embodiment.
Figure 5:
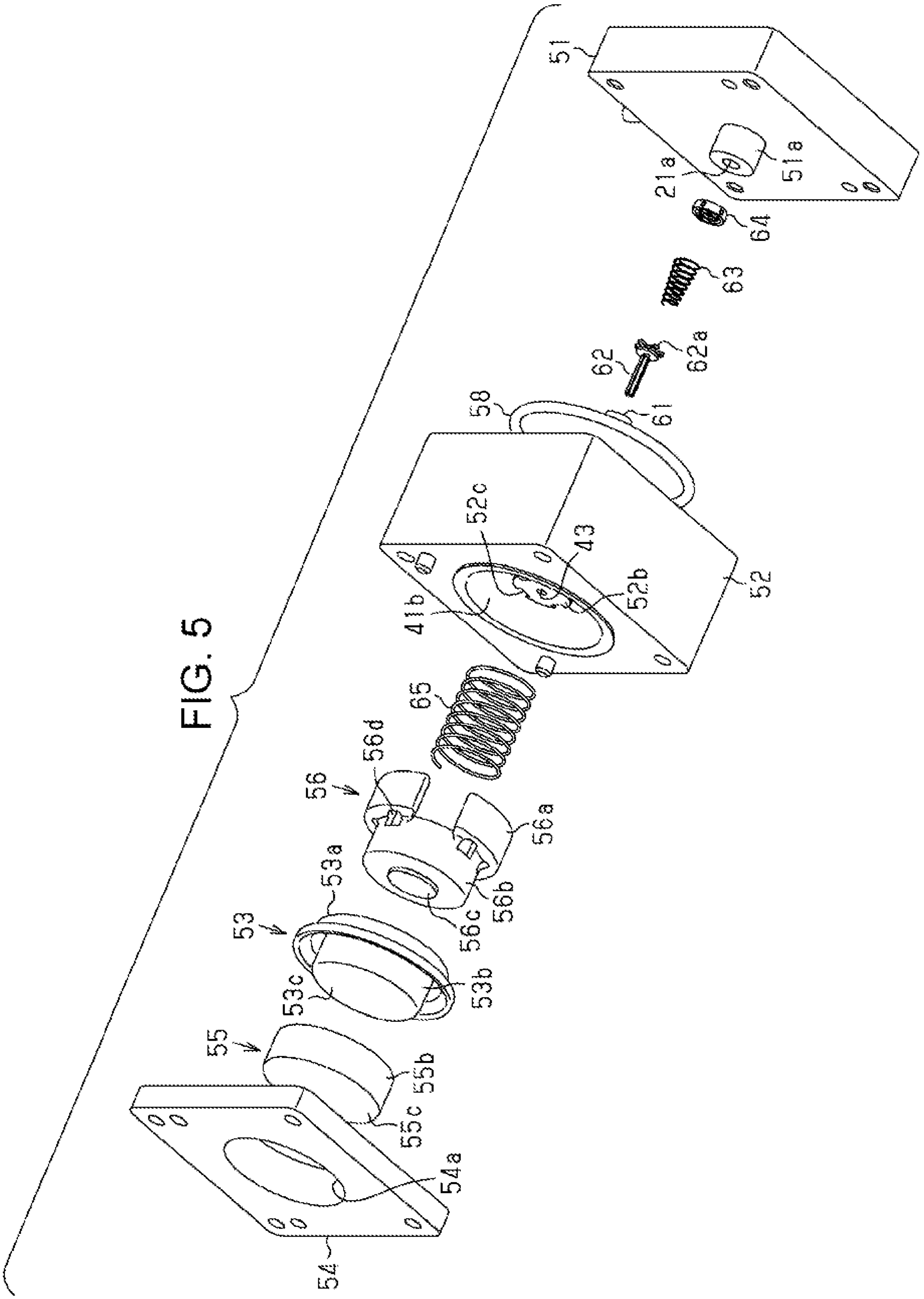
FIG. 5 is an exploded perspective view of the pressure adjustment mechanism according to the first embodiment seen from another direction.
Figure 6:
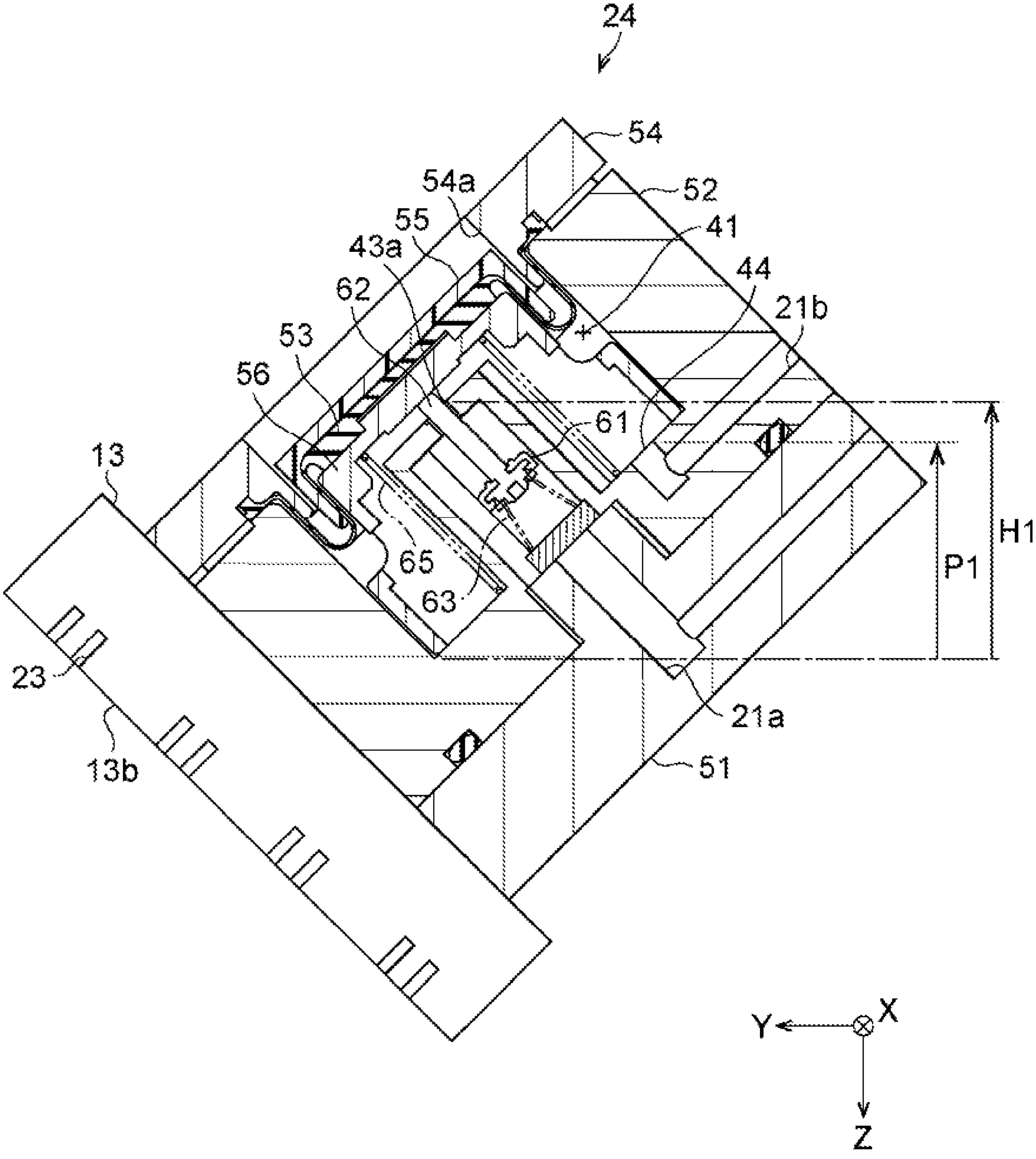
FIG. 6 is a sectional view when the pressure adjustment mechanism according to the first embodiment is in a first posture.
Figure 7:
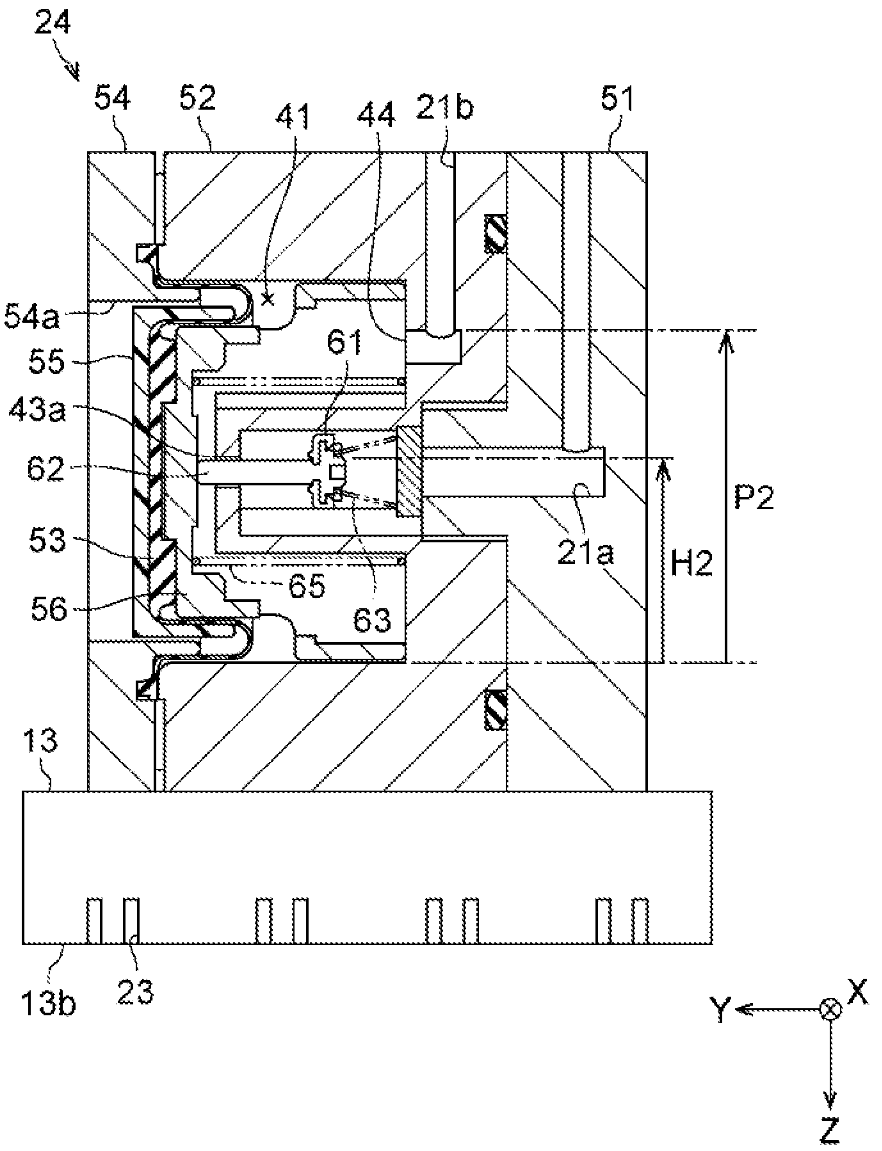
FIG. 7 is a sectional view when the pressure adjustment mechanism according to the first embodiment is in a second posture.
Figure 8:
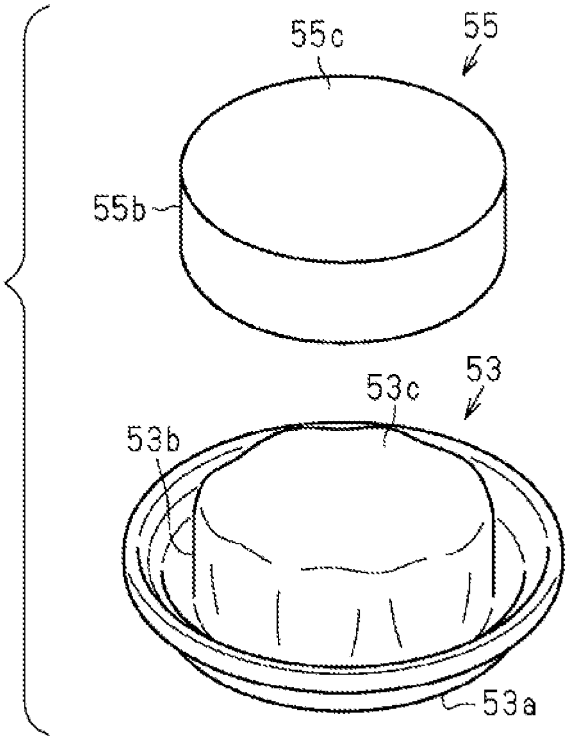
FIG. 8 is a perspective view of a displacement member and a flexible member provided in the pressure adjustment mechanism according to the first embodiment.
Figure 9:
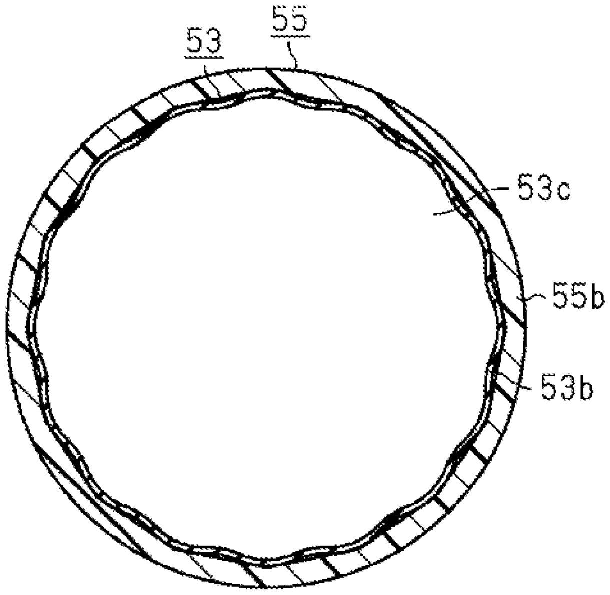
FIG. 9 is a sectional view illustrating a modification example of the displacement member according to the first embodiment.
Figure 10:
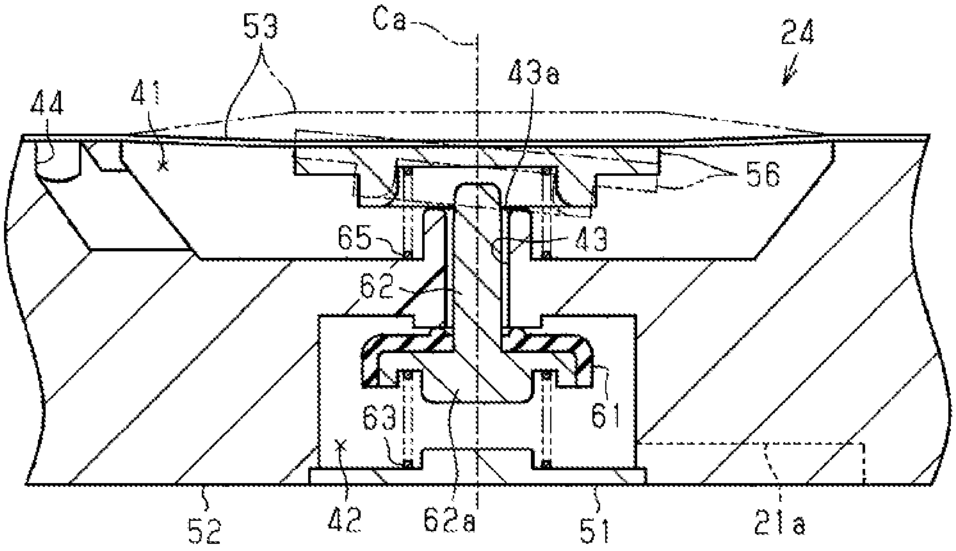
FIG. 10 is a sectional view illustrating a first modification example of the pressure adjustment mechanism according to the first embodiment.
Figure 11:
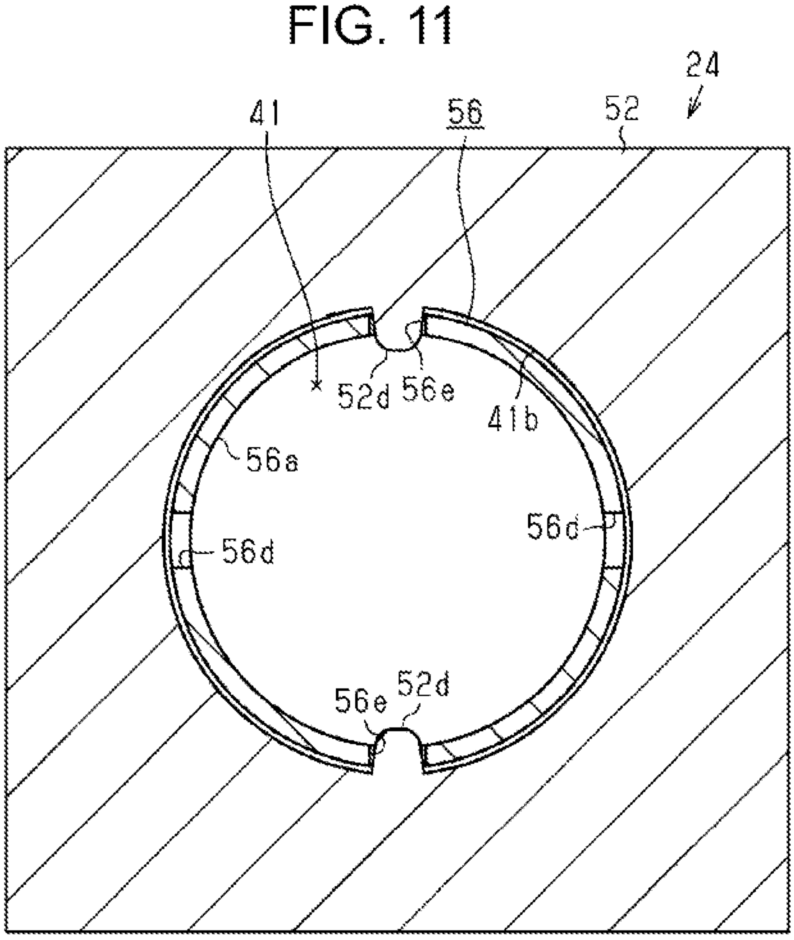
FIG. 11 is a sectional view of a second modification example of the pressure adjustment mechanism according to the first embodiment.

Next, the configuration of the pressure adjustment mechanism 24 will be illustrated. FIG. 3 is a sectional view illustrating the configuration of the pressure adjustment mechanism 24, FIG. 4 is an exploded perspective view illustrating the configuration of the pressure adjustment mechanism 24, and FIG. 5 is an exploded perspective view of the pressure adjustment mechanism 24 seen from another direction. FIG. 6 is a sectional view when the pressure adjustment mechanism 24 is in the first posture, and FIG. 7 is a sectional view when the pressure adjustment mechanism 24 is in the second posture. FIG. 8 is a perspective view of a displacement member 55 and a flexible member 53 provided in the pressure adjustment mechanism 24, and FIG. 9 is a sectional view illustrating a modification example of the displacement member 55. FIG. 10 is a sectional view illustrating a first modification example of the pressure adjustment mechanism 24, and FIG. 11 is a sectional view of a second modification example of the pressure adjustment mechanism 24.

As illustrated in FIG. 3, in the liquid supply channel 21, a portion through which the liquid flows into the pressure adjustment mechanism 24 is referred to as an inflow path 21*a* and a portion through which the liquid flows out from the pressure adjustment mechanism 24 is referred to as an outflow path 21*b*. The pressure adjustment mechanism 24 includes a liquid chamber 41 that temporarily stores the liquid to be supplied to the liquid ejecting head 13. The pressure adjustment mechanism 24 is configured by overlapping a first flow path forming member 51 in which the inflow path 21*a* is formed and a second flow path forming member 52 in which the liquid chamber 41 and the outflow path 21*b* are formed.

The liquid chamber 41 has a circular inner bottom portion 41*a* and a cylindrical inner peripheral surface 41*b* constituting a concave portion provided on one side of the first flow path forming member 51 (left side in FIG. 3) as wall surfaces. In the liquid chamber 41, the inner bottom portion 41*a* side is defined as a bottom side, and the side on which the concave portion is open is defined as a top side.

The first flow path forming member 51 has a cylindrical protruding flow path 51*a* whose central axis overlaps with the central axis Ca of the inner bottom portion 41*a* and the inner peripheral surface 41*b* and through which the inflow path 21*a* passes along the central axis. The second flow path forming member 52 has a cylindrical storage concave portion 52*a* that stores the protruding flow path 51*a* when overlapped with the first flow path forming member 51 and a cylindrical protruding portion 52*b* that is cylindrically shaped and protrudes from the inner bottom portion of the storage concave portion 52*a* into the liquid chamber 41. It is preferable that a plurality of grooves 52*c* extending along the central axis Ca is provided on the outer peripheral surface of the cylindrical protruding portion 52*b*.

When the first flow path forming member 51 and the second flow path forming member 52 overlap each other in a manner in which the protruding flow path 51*a* is stored in the storage concave portion 52*a*, a supply chamber 42 surrounded by a tip end surface of the protruding flow path 51*a* and an internal space of the cylindrical protruding portion 52*b* is formed. A communication hole 43 which allows the liquid chamber 41 and the supply chamber 42 to communicate with each other is formed at a tip end portion of the cylindrical protruding portion 52*b* protruding into the liquid chamber 41.

An opening of the communication hole 43 communicating with the liquid chamber 41 is an inflow port 43*a* through which the liquid flowing into the supply chamber 42 from the inflow path 21*a* flows into the liquid chamber 41. Further, an outflow port 44 through which liquid flows out toward the outflow path 21*b* is formed at the inner bottom portion 41*a* of the liquid chamber 41. When the liquid chamber 41 is in the second posture illustrated in FIG. 2, the central axis Ca is substantially horizontal. At this time, the outflow port 44 is disposed vertically above the central axis Ca, and the inflow port 43*a* is disposed on the central axis Ca.

The pressure adjustment mechanism 24 includes a flexible member 53 constituting a top wall surface of the liquid chamber 41, a fixing member 54 that presses the outer edge of the flexible member 53 from the outside of the liquid chamber 41 and fixes it to the second flow path forming member 52, the displacement member 55 disposed outside the liquid chamber 41 so as to overlap the flexible member 53, and a pressure receiving member 56 disposed inside the liquid chamber 41.

The flexible member 53 can be formed of an elastic body such as an elastomer (for example, rubber such as butyl rubber). The first flow path forming member 51, the second flow path forming member 52, and the fixing member 54 are fixed to each other by a fixing tool 57 such as a screw, for example, in a state in which the outer edge of the flexible member 53 is interposed between the second flow path forming member 52 and the fixing member 54. At this time, it is possible to suppress the leakage of liquid by interposing an elastic body such as an O-ring 58 between the first flow path forming member 51 and the second flow path forming member 52.

The flexible member 53 is disposed in such a manner as to close the opening of the concave portion including the inner bottom portion 41*a* and the inner peripheral surface 41*b*. At this time, the outer surface side of the flexible member 53 is open to the atmosphere. A portion extending from the outer edge toward the center of the flexible member 53 forms a curved portion 53*a* that enters the liquid chamber 41 along the inner peripheral surface 41*b* and then is folded back and curved toward the outside of the liquid chamber 41. A central portion of the flexible member 53 forms a pressure receiving wall 53*c* concentric with the opening of the liquid chamber 41. A cylindrical portion 53*b* positioned inside the inner peripheral surface 41*b* is formed between the curved portion 53*a* and the pressure receiving wall 53*c* in the flexible member 53. It is preferable that the pressure receiving wall 53*c* is thicker than the curved portion 53*a* and the cylindrical portion 53*b*. The cylindrical portion 53*b*, the pressure receiving wall 53*c*, and the curved portion 53*a* function as a flexible portion that constitutes a part of a wall surface of the liquid chamber 41.

The displacement member 55 has a cylindrical side wall 55*b* that overlaps the outer peripheral side of the cylindrical portion 53*b* of the flexible member 53 and a disk portion 55*c* that closes one end side (top end) of the side wall 55*b*. A cylindrical through-hole 54*a* into which the disk portion 55*c* of the displacement member 55 can be inserted is formed in the fixing member 54. The fixing member 54 may have an intruding portion 54*b* in which the through-hole 54*a* is extended toward bottom side of the liquid chamber 41 in such a manner to press the outer edge of the curved portion 53*a* of the flexible member 53.

The pressure receiving member 56 has a small-diameter cylindrical portion 56*b* that is cylindrically shaped and overlaps with the inner peripheral side of the cylindrical portion 53*b* of the flexible member 53, a pressure receiving portion 56*c* that is positioned at the tip end of the small-diameter cylindrical portion 56*b* and overlaps with the pressure receiving wall 53*c*, and a large-diameter cylindrical portion 56*a* that has a larger diameter than that of the small-diameter cylindrical portion 56*b*. The pressure receiving member 56 may have a circulation hole 56*d* for circulating liquid formed at the large-diameter cylindrical portion 56*a*, or the like (see FIGS. 3 and 4).

In the pressure receiving member 56, when the small-diameter cylindrical portion 56*b* and the pressure receiving portion 56*c* overlap with the cylindrical portion 53*b* and the pressure receiving wall 53*c* of the flexible member 53, respectively, the curved portion 53*a* overlaps a step portion formed between the small-diameter cylindrical portion 56*b* and the large-diameter cylindrical portion 56*a*. It is preferable that a concavo-convex shape is formed at a portion where the pressure receiving portion 56*c* and the pressure receiving wall 53*c* are in contact with each other so that both are engaged by the concavo-convex shape.

In the flexible member 53, when the internal pressure of the liquid chamber 41 increases, the cylindrical portion 53*b* and the pressure receiving wall 53*c* move in a direction of increasing the internal volume of the liquid chamber 41 (left direction in FIG. 3), and the curved portion 53*a* is deflected and displaced in accordance with the movement. Further, in the flexible member 53, when the internal pressure of the liquid chamber 41 decreases, the cylindrical portion 53*b* and the pressure receiving wall 53*c* move in a direction of decreasing the internal volume of the liquid chamber 41 (right direction in FIG. 3), and the curved portion 53*a* is deflected and displaced in accordance with the movement.

The displacement member 55 and the pressure receiving member 56 are displaced in the same direction as the cylindrical portion 53*b* and the pressure receiving wall 53*c* following the displacement of the flexible member 53. When the flexible member 53 is deflected and displaced due to the fluctuation in the pressure of the liquid chamber 41, the large-diameter cylindrical portion 56*a* of the pressure receiving member 56 moves along the inner peripheral surface 41*b* of the liquid chamber 41. That is, the pressure receiving member 56 moves along the inner peripheral surface 41*b* of the liquid chamber 41 (wall surface of the liquid chamber 41 different from flexible portion) in accordance with the displacement of the flexible portion of the flexible member 53.

The displacement member 55 disposed outside the liquid chamber 41 moves in accordance with the displacement of the flexible portion (the cylindrical portion 53*b*, the pressure receiving wall 53*c*, and the curved portion 53*a*) of the flexible member 53. At this time, the through-hole 54*a* provided in the fixing member 54 functions as a guide portion that guides the movement of the displacement member 55. Accordingly, it is preferable that the displacement member 55 has a smaller coefficient of friction with respect to the through-hole 54*a* than the flexible member 53 to reduce the frictional force generated when the displacement member 55 is brought into sliding contact with the through-hole 54*a* of the fixing member 54. For example, when the flexible member 53 is formed of an elastic body such as butyl rubber, the displacement member 55 is formed of resin (In particular, a material having a smoother surface than the flexible member 53 or a material that is less elastically deformed than the flexible member 53 may be used).

Then, when the flexible member 53 is deflected and displaced, the displacement member 55 comes into sliding contact with the through-hole 54*a* instead of the flexible member 53 coming into sliding contact with the through-hole 54*a*, so that the flexible member 53 is smoothly displaced according to the fluctuation in the pressure of the liquid chamber 41. The displacement member 55 may not be provided when the frictional force generated between the flexible member 53 and the through-hole 54*a* does not hinder the displacement because the frictional force generated when the flexible member 53 is in sliding contact with the through-hole 54*a* is small.

The pressure adjustment mechanism 24 includes a valve body 61 capable of opening and closing the inflow port 43*a*, a protruding member 62 whose base end side is stored in the supply chamber 42 and whose tip end side is stored in the liquid chamber 41, a first urging member 63 stored in the supply chamber 42, a holder 64 for holding the base end of the first urging member 63, and a second urging member 65 that urges the pressure receiving member 56 in the liquid chamber 41. The protruding member 62 has a base end portion 62*a* having a larger diameter than the communication hole 43 positioned in the supply chamber 42. The valve body 61 is formed of an elastic body attached to the base end portion 62*a*, for example.

The holder 64 is disposed at a position in contact with the tip end surface of the protruding flow path 51*a* in the supply chamber 42. The first urging member 63 has a base end side locked to the holder 64 and a tip end side locked to the base end portion 62*a*. The first urging member 63 is, for example, a conical coil spring having a diameter that decreases from the base end side to the tip end side, but may be a cylindrical coil spring.

The second urging member 65 is, for example, a cylindrical coil spring, and is disposed so as to overlap the outer peripheral side of the cylindrical protruding portion 52*b*. The second urging member 65 has a base end side locked to the inner bottom portion 41*a* and a tip end side locked to the pressure receiving portion 56*c*.

The valve body 61 closes the communication hole 43 by the urging force of the first urging member 63 received by the protruding member 62. When a coil spring that is the first urging member 63 contracts, the valve body 61 moves away from the communication hole 43. The position of the valve body 61 and the protruding member 62 (position illustrated in FIG. 3) when the valve body 61 closes the communication hole 43 is referred to as a closed position, and the position of the valve body 61 and the protruding member 62 (position illustrated in FIGS. 6 and 7) when the valve body 61 moves away from the communication hole 43 is referred to as an open position. That is, the first urging member 63 urges the valve body 61 in a direction to close the inflow port 43*a*.

Next, the operation of the pressure adjustment mechanism 24 will be described.

When the pressurized liquid flows into the supply chamber 42 from the inflow path 21*a*, the pressure (internal pressure) of the supply chamber 42 rises. The valve body 61 does not move to the open position even if the pressure of the supply chamber 42 rises. Therefore, even if the pressurized liquid is supplied to the supply chamber 42 from the inflow path 21*a*, the liquid does not flow into the liquid chamber 41 if the valve body 61 is at the closed position.

When the liquid in the liquid ejecting head 13 is consumed due to liquid ejection and the like, the liquid in the liquid chamber 41 flows out from the outflow port 44 toward the liquid ejecting head 13. When the pressure (internal pressure) of the liquid chamber 41 declines due to the outflow of the liquid, the flexible member 53 is displaced toward the inside of the liquid chamber 41. Then, the valve body 61 moves to the open position as the pressure receiving member 56 that is displaced together with the flexible member 53 pushes the protruding member 62 toward the bottom side against the urging force of the second urging member 65. As a result, the pressurized liquid in the supply chamber 42 flows into the liquid chamber 41 through the inflow port 43*a*.

When the pressure of the liquid chamber 41 rises in accordance with the inflow of the liquid, the flexible member 53 is displaced toward the outside of the liquid chamber 41. As a result, the valve body 61 moves from the open position to the closed position, so that the supply of liquid from the supply chamber 42 to the liquid chamber 41 stops. In this way, the liquid chamber 41 has a flexible portion (the cylindrical portion 53*b*, the pressure receiving wall 53*c*, and the curved portion 53*a*) that can be displaced according to the differential pressure between the internal pressure and the external pressure (atmospheric pressure) of the liquid chamber 41 as a part of the wall surface, and the valve body 61 opens and closes the inflow port 43*a* in accordance with the displacement of the flexible portion.

Here, when the pressure receiving portion 56*c* approaches the protruding member 62, the second urging member 65 pushes back the pressure receiving portion 56*c* in the direction away from the protruding member 62. Therefore, when the pressure of the liquid chamber 41 declines and the pressure receiving portion 56*c* pushes the protruding member 62 against the urging force of the first urging member 63 and the second urging member 65, the valve body 61 moves to the open position. Further, before the pressure in the liquid chamber 41 rises so as to become a positive pressure due to the inflow of liquid, the pressure receiving portion 56*c* moves away from the protruding member 62 due to the urging force of the second urging member 65. Therefore, the pressure in the liquid chamber 41 is kept within a range of negative pressure according to the urging force of the second urging member 65.

In this way, the movement of the valve body 61 to the open position occurs due to the displacement of the flexible member 53. Therefore, the valve body 61 moves autonomously between the closed position and the open position by the differential pressure between the atmospheric pressure and the liquid chamber 41 without using driving force such as a motor. For this reason, the pressure adjustment mechanism 24 is referred to as a differential pressure valve (or a self-sealing valve), and the autonomous pressure adjustment function by the differential pressure valve is also referred to as a self-sealing function.

When the liquid flows into the liquid chamber 41 through the inflow port 43*a*, bubbles may be introduced and gas may be accumulated in the upper portion of the liquid chamber 41. When such a gas becomes bubbles and flows out to the outflow port 44 together with the liquid, ejection failure in which droplets are not appropriately ejected from the nozzle 23 may occur when the bubbles are introduced into the nozzle 23.

For this reason, the liquid ejecting apparatus 100 includes the maintenance unit 31, and as a maintenance operation, performs suction cleaning of suctioning the liquid from the nozzle 23 and discharging the gas in the liquid ejecting head 13 and the liquid chamber 41 together with the liquid.

Here, since the gas mixed into the liquid chamber 41 is accumulated in the upper portion of the liquid chamber 41, the gas easily flows out during the cleaning when the outflow port 44 is provided at the upper portion of the liquid chamber 41.

In that respect, as illustrated in FIGS. 6 and 7, the position of the outflow port 44 in the liquid chamber 41 in the first posture at the time of printing (posture illustrated in FIG. 6) is lower than the position of the outflow port 44 in the liquid chamber 41 in the second posture at the time of maintenance (posture illustrated in FIG. 7). That is, when the height of the outflow port 44 from the lower end (bottom) of the liquid chamber 41 in the first posture is P1, and the height of the outflow port 44 from the lower end (bottom) of the liquid chamber 41 in the second posture is P2, P1<P2.

The outflow port 44 is at a position lower than the inflow port 43*a* in the first posture and is at a position higher than the inflow port 43*a* in the second posture. That is, when the height of the inflow port 43*a* from the lower end (bottom) of the liquid chamber 41 in the first posture is H1, and the height of the inflow port 43*a* from the lower end (bottom) of the liquid chamber 41 in the second posture is H2, P1<H1 and P2>H2.

Next, the operation of the liquid ejecting apparatus 100 of the present embodiment will be described.

The liquid ejecting apparatus 100 includes the displacement mechanism 14 that changes the posture of the liquid ejecting head 13 and the liquid chamber 41 between the first posture when ejecting liquid toward the paper S and a second posture when performing maintenance of the liquid ejecting head 13. At the time of printing in which the liquid ejecting head 13 ejects liquid toward paper S, the liquid ejecting head 13 and the liquid chamber 41 are in the first posture. Therefore, when liquid is ejected from the nozzle 23, the liquid flows out from the outflow port 44 at a position lower than the inflow port 43*a*. In this way, at the time of liquid ejection, since the outflow port 44 is at a low position in the liquid chamber 41, even if gas is accumulated in the upper portion of the liquid chamber 41, bubbles hardly flow out to the nozzle 23.

When the liquid ejecting head 13 and the liquid chamber 41 are in the second posture and the maintenance unit 31 performs suction cleaning, in accordance with the driving of the suction mechanism 36, a negative pressure is generated in the closed space formed between the cap 33 and the nozzle surface 13*b*, and the negative pressure reaches the liquid chamber 41 through the outflow path 21*b*. Then, the pressure of the liquid chamber 41 declines, the valve body 61 moves to the open position, and the pressurized liquid flows into the liquid chamber 41 through the inflow path 21*a*. Therefore, liquid flows from the inflow port 43*a* toward the outflow port 44 in the liquid chamber 41, and the gas accumulated in the liquid chamber 41 rides on the flow and flows out from the outflow port 44. At the time of suction cleaning, the outflow port 44 is at a high position in the liquid chamber 41, the gas accumulated in the upper portion of the liquid chamber 41 can be easily discharged.

Here, when the pressure in the liquid chamber 41 becomes negative due to suction, the bubbles mixed into liquid expand, so that they are easily discharged from the liquid chamber 41. That is, the discharge characteristics of bubbles in suction cleaning are related to the magnitude of the negative pressure due to suction. For example, when the altitude of the installation place of the liquid ejecting apparatus 100 is different, the negative pressure generated with respect to the suction force changes, and the bubble discharge characteristics may deteriorate. Even in this case, if the outflow port 44 is disposed at the upper portion of the liquid chamber 41 at the time of cleaning, the gas accumulated in the upper portion of the liquid chamber 41 is efficiently discharged.

In particular, in order to discharge the gas accumulated in the liquid chamber 41 upstream of the liquid ejecting head 13, it is necessary to discharge more liquid than when cleaning only the inside of the liquid ejecting head 13. The amount of liquid consumed by cleaning can be reduced by improving the gas discharge performance.

In order to further expand the bubbles and improve the discharge performance, an open/closed valve which functions as a choke valve may be provided in the inflow path 21*a* to perform choke cleaning in which suction is performed with the open/closed valve closed and the open/closed valve is opened when the negative pressure in the liquid chamber 41 increases. Even in a case where a small bubble is stuck in a flow path, if choke cleaning is performed, bubbles largely expanded by a strong negative pressure can be removed from the flow path with the pressure fluctuation shock due to the opening of choke valve and swept away at once by liquid that vigorously flows due to a large differential pressure.

In addition, when cleaning is performed, liquid may flow out from the nozzle 23 by providing a pressing mechanism that pushes the pressure receiving member 56 from the outside of the liquid chamber 41 and forcibly moving the valve body 61 to the open position. According to this configuration, cleaning (pressurized cleaning) can be performed without providing a device for suction. Further, the pressurization for pressurized wiping may be performed by adjusting the amount of pressing by which the pressing mechanism pushes the pressure receiving member 56 and making the liquid flow out from the liquid chamber 41 to the extent that the liquid is not discharged from the nozzle 23. In this case, the pressure adjustment mechanism 24 can be used as a part of a pressurizing mechanism for performing pressurized cleaning, pressurized wiping, or the like. Furthermore, the liquid can be pressurized and supplied to the liquid ejecting head 13 by the pressing force of the pressing mechanism. In this case, the liquid chamber 41 functions as a pump chamber for the pressurization pump.

When deflecting and displacing the flexible member 53 in a flat state (illustrated in FIG. 10), the reaction to pressure fluctuations may vary due to the reaction force of tension. In that respect, when the curved portion 53*a* is formed and displaced in the flexible member 53, it becomes less susceptible to the reaction force, and thus the reactivity to pressure fluctuation is improved. However, when the curved portion 53*a* is formed in the flexible member 53, the cylindrical portion 53*b* or the like may be wrinkled.

For example, as illustrated in FIG. 9, when trying to form the curved portion 53*a* by deforming the disk-shaped flexible member 53, there is a possibility that irregular wrinkles are formed in the cylindrical portion 53*b*, and the way in which the pressure fluctuation received by the pressure receiving wall 53*c* is transmitted to the curved portion 53*a* may fluctuate due to the reaction force generated in that portion.

Therefore, as illustrated in a modification example in FIG. 9, when the inner peripheral surface of the side wall 55*b* of the displacement member 55 is formed to have a regular polygonal cross section (regular dodecagonal shape in FIG. 9) so that regular wrinkles can be formed in the cylindrical portion 53*b* when the displacement member 55 is placed on the flexible member 53. In this way, the shape of the wrinkles of the cylindrical portion 53*b* can be stabilized, and the reaction of the flexible member 53 to the pressure fluctuation can be stabilized.

The pressure adjustment mechanism 24 can be changed to the differential pressure valve of the first modification example illustrated in FIG. 10. In the pressure adjustment mechanism 24 of this modification example, the flexible member 53 is made of a film, the pressure receiving member 56 is plate-shaped, and the large-diameter cylindrical portion 56*a* described in the first embodiment is not provided. Therefore, it is possible to make the device thinner by shortening the length along the central axis Ca of the pressure adjustment mechanism 24.

However, when the pressure receiving member 56 does not include the large-diameter cylindrical portion 56*a*, the pressure receiving member 56 may be inclined and the reactivity to the pressure fluctuation may vary when the pressure receiving member 56 is displaced in accordance with the pressure fluctuation of the liquid chamber 41. In particular, when the flexible member 53 does not have the curved portion 53*a* and is deflected and displaced in a flat state, the pressure receiving member 56 is not easily inclined when the flexible member 53 is stretched so as to spread outside the liquid chamber 41 as indicated by a two-dot chained line in FIG. 10. However, when there is not much tension left on the flexible member 53 as indicated by a solid line in FIG. 10, the pressure receiving member 56 may be inclined as indicated by the two-dot chained line in FIG. 10.

When the pressure receiving member 56 is inclined, the timing of pushing the protruding member 62 varies, which leads to variation in the opening and closing pressure of the valve body 61. Therefore, in the case where priority is given to the reactivity to the pressure fluctuation of the liquid chamber 41 over the thinning of the pressure adjustment mechanism 24, a pressure receiving member 56 having a cylindrical large-diameter cylindrical portion 56*a* that is cylindrically shaped along the inner peripheral surface 41*b* of the liquid chamber 41 may be employed.

In addition, as in the pressure adjustment mechanism 24 of the second modification example illustrated in FIG. 11, one or more protruding portion 52*d* that protrude into the liquid chamber 41 may be provided on the inner peripheral surface 41*b* of the second flow path forming member 52, and an engaging portion 56*e* with which the protruding portion 52*d* engages may be provided on the large-diameter cylindrical portion 56*a* of the pressure receiving member 56. According to this configuration, unnecessary rotation of the cylindrical pressure receiving member 56 can be suppressed by engaging the engaging portion 56*e* with the protruding portion 52*d*. The engaging portion 56*e* may be a hole or a concave portion. Further, when a plurality of circulation holes 56*d* are provided in the large-diameter cylindrical portion 56*a* of the pressure receiving member 56, a part of the plurality of circulation holes 56*d* may be used as the engaging portion 56*e* with which the protruding portion 52*d* engages. According to this configuration, it is possible to suppress the rotation of the pressure receiving member 56 while securing a circulation path of liquid in the liquid chamber 41.

According to the pressure adjustment mechanism 24 of the present embodiment, the following effects can be obtained.

When the liquid is ejected toward the paper S, the liquid chamber 41 is in the first posture and the outflow port 44 is disposed at a low position, so that the gas accumulated in the liquid chamber 41 is difficult to flow out. For this reason, when the liquid is ejected toward the paper S, the ejection failure due to the bubbles being introduced into the nozzle 23 hardly occurs. On the other hand, when maintenance is performed, the liquid chamber 41 is in the second posture and the outflow port 44 is disposed at a high position, so that the gas accumulated in the liquid chamber 41 easily flows out. Therefore, when performing maintenance, it becomes easier to discharge gas than when liquid is ejected.

In the first posture in which the liquid is ejected toward the paper S, the outflow port 44 of the liquid chamber 41 is at a position lower than the inflow port 43*a*. Therefore, the gas accumulated in the liquid chamber 41 does not easily flow out, and the gas flowing into the liquid chamber from the inflow port when the liquid is ejected is also difficult to flow out. On the other hand, when performing maintenance, since the outflow port 44 of the liquid chamber 41 is disposed at a position higher than the inflow port 43*a*, the gas accumulated in the liquid chamber 41 is likely to flow out, and the gas flowing into the liquid chamber 41 from the inflow port 43*a* due to maintenance also easily flows out. Therefore, when performing maintenance, it becomes easier to discharge gas than when liquid is ejected.

Since the displacement mechanism 14 displaces the liquid ejecting head 13 so that the inclination of the nozzle surface 13*b* with respect to the horizontal changes, the liquid chamber 41 can be inclined up to 90 degrees together with the liquid ejecting head 13 and change the height of the outflow port 44 and the like in the liquid chamber 41.

By suctioning liquid in the liquid ejecting head 13 and the liquid chamber 41 through the nozzle 23 as maintenance, it is possible to perform suction cleaning to discharge foreign objects such as bubbles together with the liquid.

Since the valve body 61 opens and closes the inflow port 43*a* by the displacement of the flexible portion (the cylindrical portion 53*b*, the pressure receiving wall 53*c*, and the curved portion 53*a*) according to the differential pressure between the internal pressure and the external pressure of the liquid chamber 41, the pressure of the liquid chamber 41 that supplies the liquid to the liquid ejecting head 13 can be adjusted appropriately.

As the pressure receiving member 56 moves along the inner peripheral surface 41*b* in the liquid chamber 41, the displacement of the flexible portion (the cylindrical portion 53*b*, the pressure receiving wall 53*c*, and the curved portion 53*a*) due to pressure fluctuation can be stabilized.

When the flexible portion (the cylindrical portion 53*b*, the pressure receiving wall 53*c*, and the curved portion 53*a*) is displaced, the displacement member 55 having a smaller coefficient of friction than that of the flexible portion comes into contact with the through-hole 54*a* as the guide portion, so that the displacement of the flexible portion due to pressure fluctuation can be stabilized.

When the position of the outflow port 44 in the liquid chamber 41 in the first posture is lower than the position of the outflow port 44 in the liquid chamber 41 in the second posture, the position of the outflow port 44 in the first posture may be higher than the inflow port 43*a*, the position of the outflow port 44 in the second posture may be lower than the inflow port 43*a*, or the height of the outflow port 44 and the inflow port 43*a* in both postures may be the same.

A pressurizing mechanism capable of pressurizing liquid may be provided, and the pressurized liquid may be supplied to the liquid ejecting head 13 through the liquid supply channel 21 by the operation of the pressurizing mechanism. The pressurizing mechanism may pressurize the liquid in the liquid storage portion 19 or may supply the liquid sucked from the liquid storage portion 19 with pressure toward the downstream.

Figure 12:
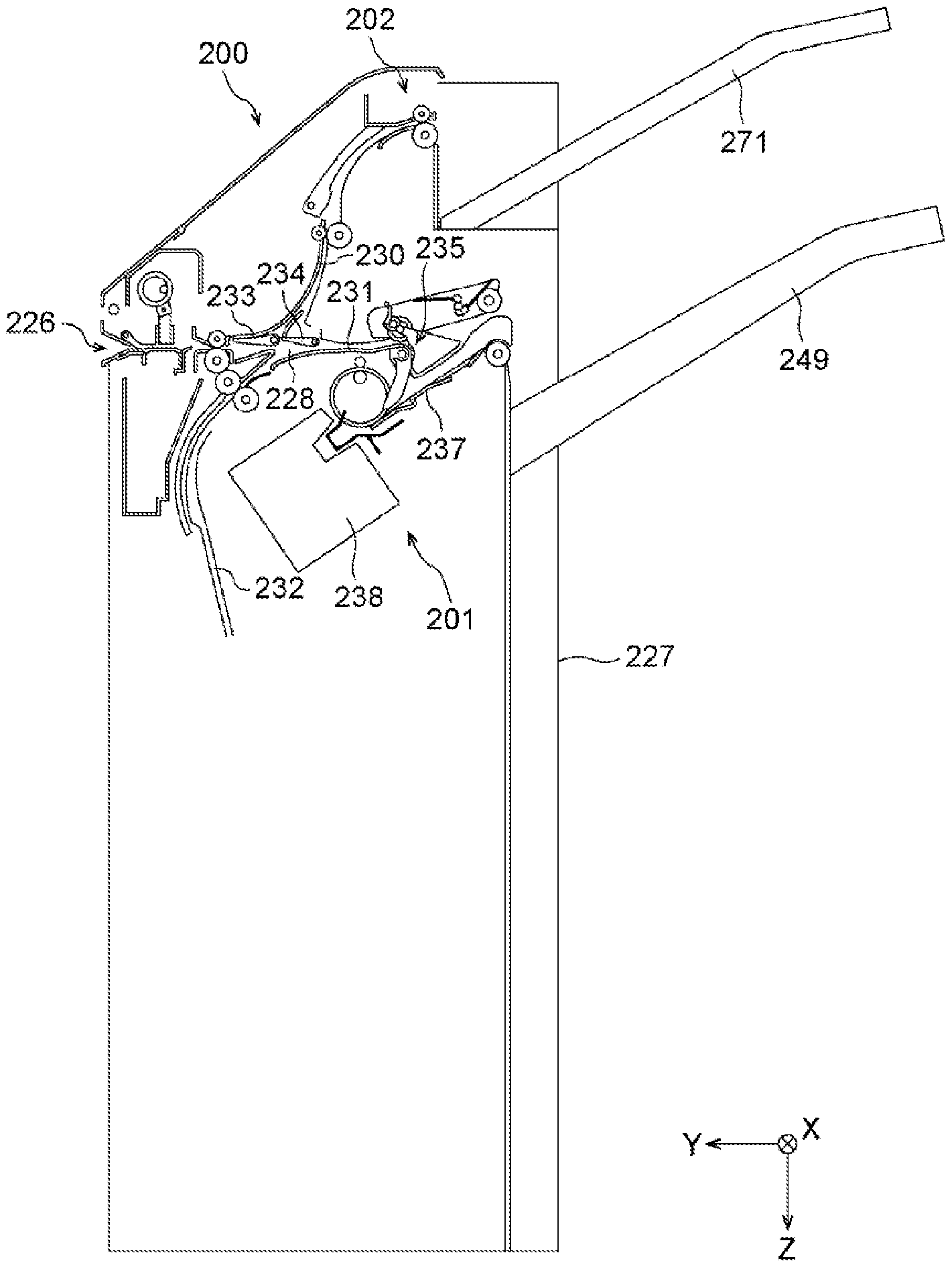
FIG. 12 is a schematic view illustrating the configuration of a media processing apparatus according to the first embodiment.

Next, the configuration of the media processing apparatus 200 will be described. FIG. 12 is a schematic view illustrating the configuration of the media processing apparatus 200.

The media processing apparatus 200 is an apparatus that processes the paper S transported from the liquid ejecting apparatus 100 on which an image is recorded. The media processing apparatus 200 is on the −Y direction side in the +Y direction and the −Y direction that are the width direction of the housing 101 of the liquid ejecting apparatus 100, that is on, the first surface 101*a* side and is arranged in parallel on one side. The media processing apparatus 200 includes a housing 227 and a bring-in port 226 at a position corresponding to the first discharge port 80 of the liquid ejecting apparatus 100.

The media processing apparatus 200 includes a paper bring-in path 228 through which the paper S from the bring-in port 226 is introduced, a first paper discharge path 231, a second paper discharge path 232, and a third paper discharge path 230 that are branched downstream of the paper bring-in path 228, a first path switching unit 233, and a second path switching unit 234. The first path switching unit 233 is constituted by a flapper guide that changes the transport direction of the paper S, and the mode can be switched between a mode to guide paper S transported from the bring-in port 226 to the third paper discharge path 230 and a mode to guide the paper S in the direction of the first paper discharge path 231 and the second paper discharge path 232 by a driving unit (not illustrated).

The first paper discharge path 231 and the second paper discharge path 232 are disposed in communication such that the transport direction of the paper S once introduced into the first paper discharge path 231 can be reversed and the paper S can be switched back and transported to the second paper discharge path 232. The mode of the second path switching unit 234 can be switched between a mode to introduce the paper S sent from the first path switching unit 233 into the first paper discharge path 231 and a switchback transport mode that introduces the paper S introduced into the first paper discharge path 231 into the second paper discharge path 232 by a driving unit (not illustrated). In the paper bring-in path 228, a punch unit for punching a punch hole in the brought-in paper S is disposed.

The media processing apparatus 200 includes a first processing unit 201 that aligns and stacks the paper S sent from the first paper discharge path 231 and binds them and a second processing unit 202 that offsets the paper S sent from the third paper discharge path 230 by a predetermined amount in the orthogonal direction. In addition to the housing 227, a first tray 249 and a second tray 271 for stacking paper S or a bundle of paper S that is processed and sent by the first and second processing units 201 and 202, respectively are provided.

The first processing unit 201 includes a processing tray 237 for aligning and stacking paper S sent from a paper discharge port 235, and a stapler unit 238 for binding a bundle of stacked paper S. The processing tray 237 is provided below the paper discharge port 235 of the first paper discharge path 231, switches back the transport direction of the paper S brought out from the paper discharge port 235, and the paper S is introduced onto the processing tray 237. The paper S is positioned at a predetermined binding position on the processing tray 237 by a positioning mechanism and is bound by the stapler unit 238, and the bundle of bound paper S is brought out to the first tray 249 by a paper bundle bring-out mechanism.

The second processing unit 202 performs jog sorting that sorts the paper S transported to the third paper discharge path 230 by offsetting in the paper discharge orthogonal direction, and stores the paper S in the second tray 271.

As described above, according to the present embodiment, the following effects can be obtained.

In the liquid ejecting apparatus 100 and the recording system 1, the first transport path R1 passes above the mounting portion 20. Accordingly, even when the liquid from the mounting portion 20 drips, the possibility of the dripping liquid adhering to the paper S on which recording is performed is reduced, and thereby the degradation of image quality can be suppressed. Further, since the mounting portion 20 is disposed at a position higher than the nozzle surface 13*b*, liquid can be easily pressurized and supplied to the liquid ejecting head 13.

2. Second Embodiment

Figure 13:
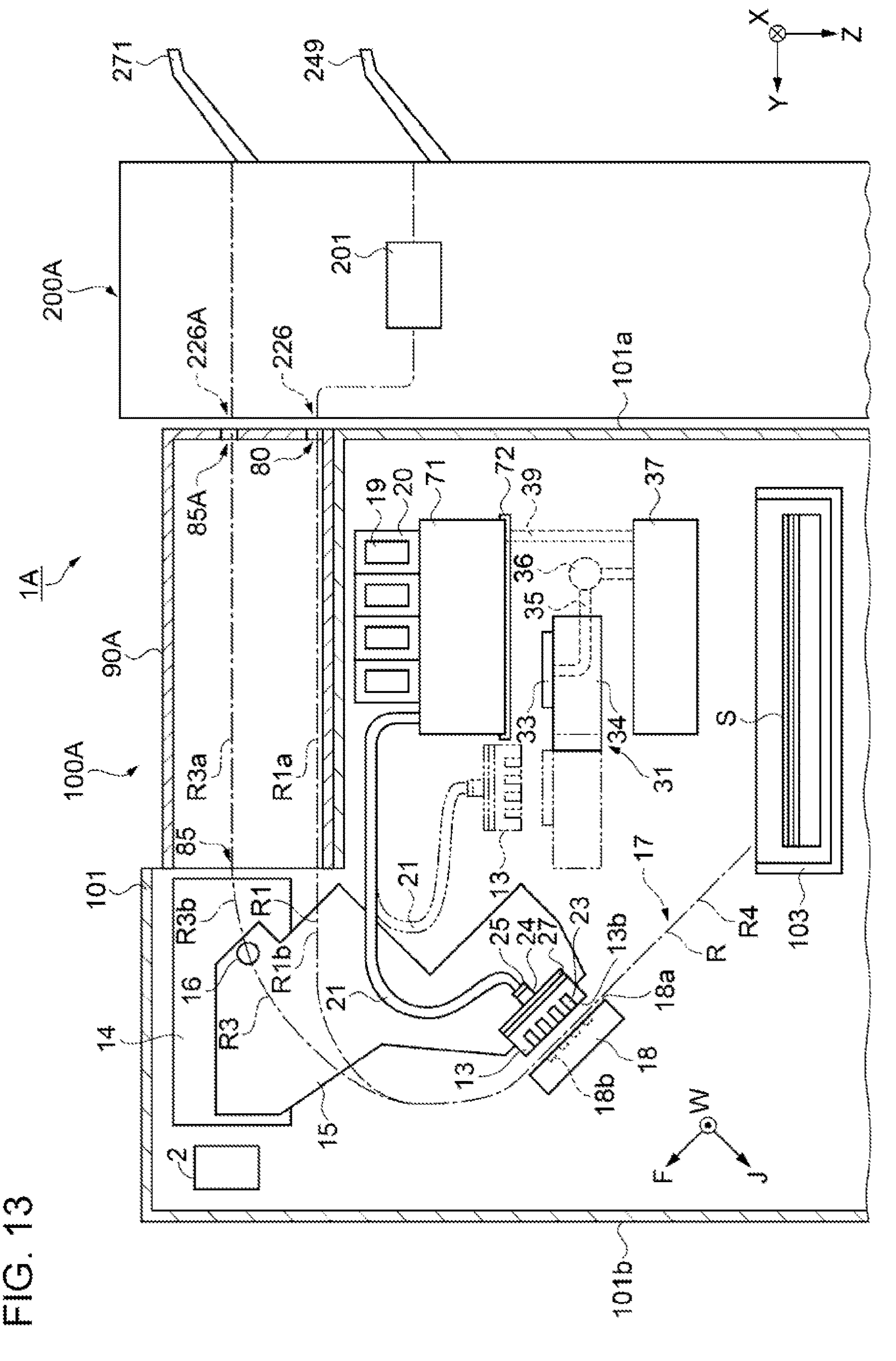
FIG. 13 is a schematic view illustrating the configuration of a recording system according to a second embodiment.

Next, a second embodiment will be described. FIG. 13 is a schematic view illustrating the configuration of a recording system 1A according to the present embodiment. As illustrated in FIG. 13, the recording system 1A includes a liquid ejecting apparatus 100A and a media processing apparatus 200A.

The liquid ejecting apparatus 100A includes the transport unit 17 that transports the paper S along the transport path R, the liquid ejecting head 13 that performs recording by ejecting liquid onto the transported paper S from the nozzle 23 formed at the nozzle surface 13*b*, the mounting portion 20 to which the liquid storage portion 19 that stores liquid to be supplied to the liquid ejecting head 13 is mounted, the first discharge port 80 that delivers the recorded paper S toward the media processing apparatus 200A that processes the paper S, and the first transport path R1 that passes above the mounting portion 20. Further, a second discharge port 85A for delivering the recorded paper S to media processing apparatus 200A is provided. The transport path R has a third transport path R3 that is a portion from a position corresponding to the liquid ejecting head 13 to the second discharge port 85A. Here, a position corresponding to the liquid ejecting head 13 refers to a position where the transport path R faces the nozzle surface 13*b* when the liquid ejecting head 13 is in the first posture. Since the configuration other than the second discharge port 85A and the third transport path R3 is the same as that of the first embodiment, the description thereof is omitted.

The second discharge port 85A is provided at the upper end portion of the housing 101 in the −Y direction. The second discharge port 85A has an opening portion provided in the housing 101. The recorded paper S is transported along the third transport path R3, and is delivered to a bring-in port 226A of the media processing apparatus 200A through the second discharge port 85A. Further, the third transport path R3 is disposed above the first transport path R1. The first transport path R1 passes between the third transport path R3 and the mounting portion 20.

Here, a unit transport path 90A in which the first discharge port 80, the first connecting path R1*a* of the first transport path R1 coupled to the first discharge port 80, the second discharge port 85A, and a second connecting path R3*a* of the third transport path R3 coupled to the second discharge port 85A are integrated may be formed. The unit transport path 90A is configured to be attachable and detachable to and from the portion Rlb of the first transport path R1 excluding the first connecting path Rla and a portion R3*b* of the third transport path R3 excluding the second connecting path R3*a*.

The media processing apparatus 200A includes the first processing unit 201 that aligns and stacks the paper S transported from the first discharge port 80 through the bring-in port 226 and binds them. The processed paper S is loaded on the first tray 249. Since the configuration of the transport system related to the first processing unit 201 and the first processing unit 201 is the same as that of the first embodiment, description thereof is omitted.

The media processing apparatus 200A in the recording system 1A of the present embodiment has the bring-in port 226A, and is configured such that the paper S transported from the second discharge port 85A is discharged to the second tray 271 through the bring-in port 226A. That is, the first path switching unit 233 and the third paper discharge path 230 in the first embodiment are omitted in the media processing apparatus 200A.

As described above, according to the present embodiment, the following effects can be obtained.

In the liquid ejecting apparatus 100A and the recording system 1A, the first transport path R1 is disposed between the third transport path R3 and the mounting portion 20, so that the space can be saved.

3. Third Embodiment

Figure 14:
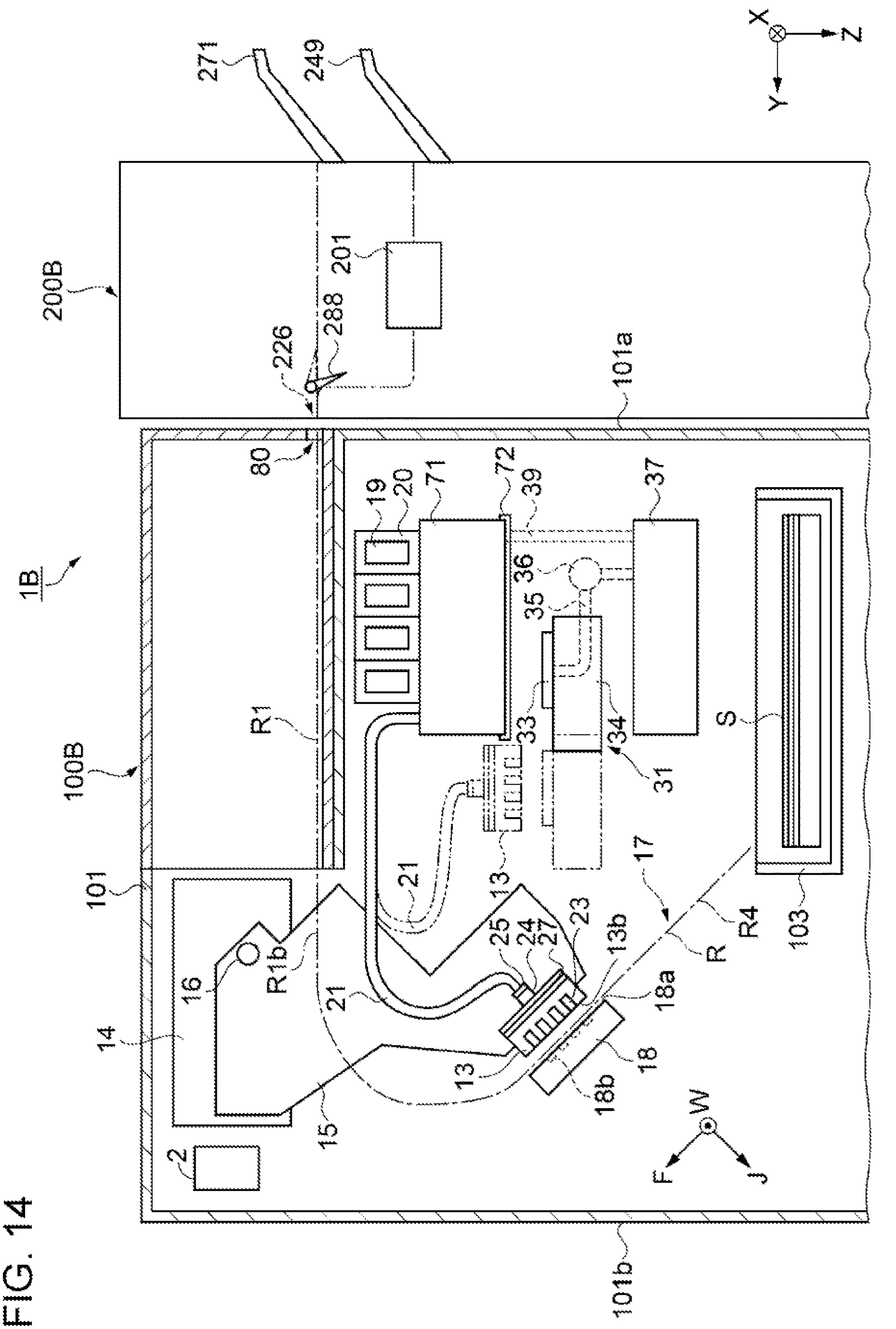
FIG. 14 is a schematic view illustrating the configuration of a recording system according to a third embodiment.

Next, a third embodiment will be described. FIG. 14 is a schematic view illustrating the configuration of a recording system 1B according to the present embodiment. As illustrated in FIG. 14, the recording system 1B includes a liquid ejecting apparatus 100B and a media processing apparatus 200B.

The liquid ejecting apparatus 100B includes the transport unit 17 that transports the paper S along the transport path R, the liquid ejecting head 13 that performs recording by ejecting liquid onto the transported paper S from the nozzle 23 formed at the nozzle surface 13*b*, the mounting portion 20 to which the liquid storage portion 19 that stores liquid to be supplied to the liquid ejecting head 13 is mounted, the first discharge port 80 that delivers the recorded paper S toward the media processing apparatus 200B that processes the paper S, and the first transport path R1 that passes above the mounting portion 20.

Here, the difference between the liquid ejecting apparatus 100B of the present embodiment and the above-described liquid ejecting apparatuses 100 and 100A is that the second transport path R2 and the third transport path R3 are omitted in the liquid ejecting apparatus 100B. Other configurations are the same as those of the above-described embodiments, and thus the description thereof is omitted.

The media processing apparatus 200B includes the second tray 271 as a first stacking portion that stacks the paper S delivered from the first discharge port 80 of the liquid ejecting apparatus 100B without processing, the first processing unit 201 as a processing unit that performs processing on the paper S delivered from the first discharge port 80, and the first tray 249 as a second stacking unit that stacks the paper S processed by the first processing unit 201. Since the configuration of the transport system related to the first processing unit 201 and the first processing unit 201 is the same as that of the first embodiment, description thereof is omitted.

The media processing apparatus 200B of the present embodiment has the bring-in port 226, and the paper S transported from the first discharge port 80 is transported into the media processing apparatus 200B through the bring-in port 226.

The media processing apparatus 200B includes a flapper guide 288 as a switching unit that switches between two transport paths at downstream of the bring-in port 226 in the transport direction of the paper S. One transport path communicates with the first tray 249 through the first processing unit 201. The other transport path communicates with the second tray 271 without passing through the first processing unit 201. That is, in the recording system 1B of the present embodiment, the paper S on which recording is performed in the liquid ejecting apparatus 100B is transported in common from the first discharge port 80 to the media processing apparatus 200B, and a path for discharging the paper S on which recording is performed in the media processing apparatus 200B without being processed and a path for discharging the paper S processed by the first processing unit 201 are provided.

As described above, according to the present embodiment, the following effects can be obtained.

By providing a path for discharging the recorded paper S as it is and a path for discharging the processed paper S in the media processing apparatus 200B, the configuration of the transport unit 17 and the transport path R of the liquid ejecting apparatus 100B can be simplified.

4. Fourth Embodiment

Figure 15:
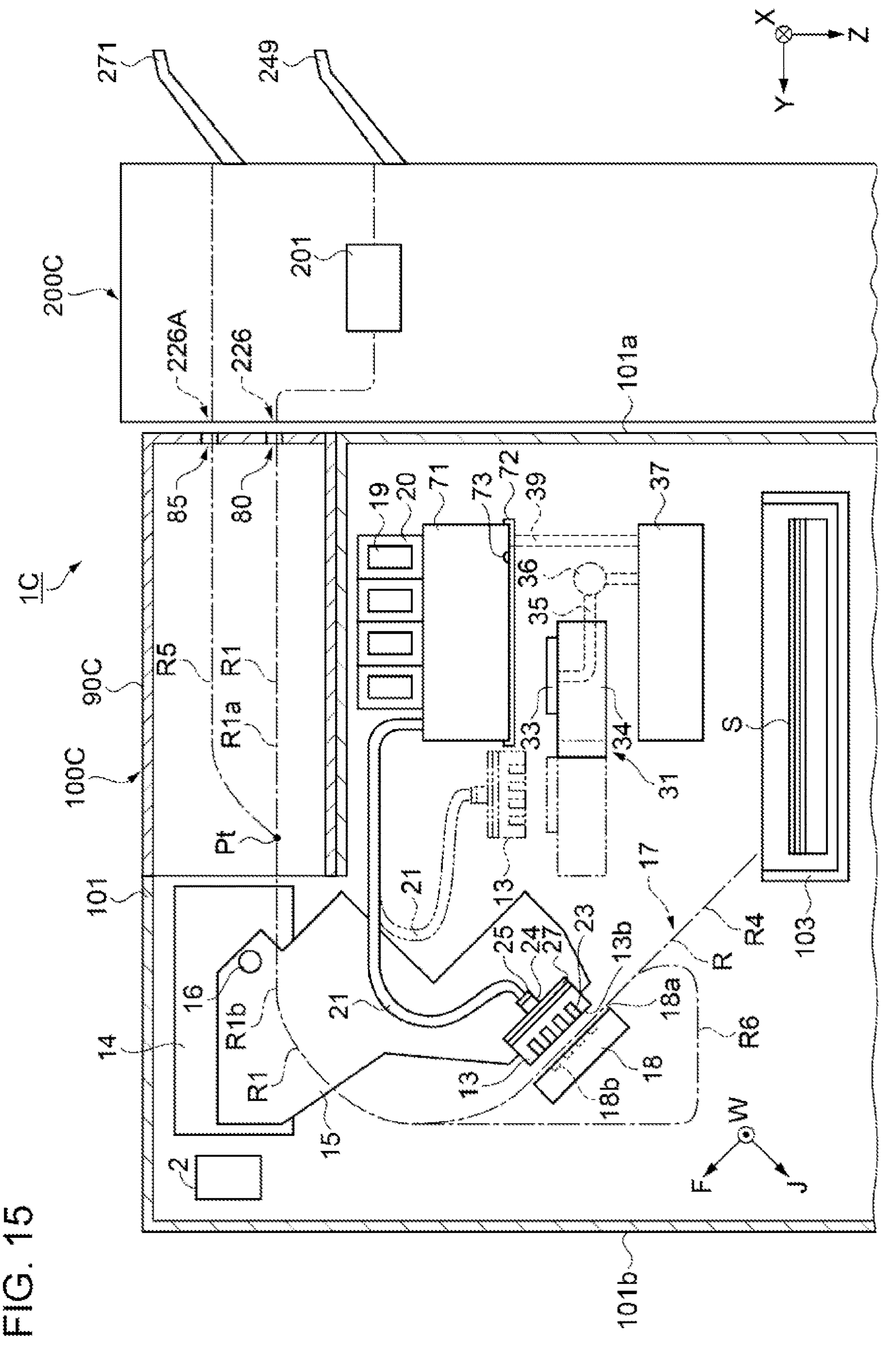
FIG. 15 is a schematic view illustrating the configuration of a recording system according to a fourth embodiment.

Next, a fourth embodiment will be described. FIG. 15 is a schematic view illustrating the configuration of a recording system 1C according to the present embodiment. As illustrated in FIG. 15, the recording system 1C includes a liquid ejecting apparatus 100C and a media processing apparatus 200C. The recording system 1C includes a control unit 2 (FIG. 15) that comprehensively controls driving of each mechanism of the liquid ejecting apparatus 100C and the media processing apparatus 200C. The liquid ejecting apparatus 100C is, for example, an ink jet printer for recording an image such as letters, figures, and photos by adhering liquid to paper S as an example of a medium. The liquid is, for example, ink. The media processing apparatus 200C is disposed adjacent to the liquid ejecting apparatus 100C. The media processing apparatus 200C is a post-processing apparatus including a first processing unit 201 (FIGS. 15 and 16) that performs post-processing such as a stapler process of stapling paper S on which recording of an image is performed by the liquid ejecting apparatus 100C, with a staple (needle).

Next, the configuration of the liquid ejecting apparatus 100C will be described. FIG. 15 is a schematic view illustrating the configuration of the liquid ejecting apparatus 100C. As illustrated in FIG. 15, the liquid ejecting apparatus 100C includes the housing 101, the liquid ejecting head 13 that ejects the liquid in the housing 101, the maintenance unit 31 that performs maintenance of the liquid ejecting head 13, the displacement mechanism 14 that displaces the liquid ejecting head 13, the paper cassette 103 that stores a plurality of paper S, and the medium support unit 18 that supports the paper S transported from the paper cassette 103. Further, the transport unit 17 that transports the paper S along the transport path R (one dot chain line in FIG. 15) is provided. The transport unit 17 includes a plurality of transport rollers that are rotated by driving of a driving motor (not illustrated), a driven roller provided on each transport roller, a guide for guiding the paper S, and the like. By driving of the driving motor, the paper S pinched between the transport roller and the driven roller is transported along the transport path R by the rotation of the transport roller. The paper S discharged from the paper cassette 103 is transported by the transport unit 17 along the transport path R to the media processing apparatus 200C. The detailed configuration of the transport path R will be described later. The control unit 2 controls a moving mechanism 34 that moves the maintenance unit 31 in the +Y direction or the −Y direction, the liquid ejecting head 13, the displacement mechanism 14, the maintenance unit 31, the driving motor of the transport unit 17, and the like.

The mounting portion 20 on which one or a plurality of liquid storage portions 19 for storing liquid supplied to the liquid ejecting head 13 is provided inside the housing 101. Four liquid storage portions 19 are provided in the present embodiment. The liquid storage portion 19 may be a cartridge attachable and detachable to and from the mounting portion 20 or may be a tank into which liquid can be filled. The mounting portion 20 is disposed at a position higher than a nozzle surface 13*b* of the liquid ejecting head 13. That is, the mounting portion 20 is disposed at a position shifted from the nozzle surface 13*b* of the liquid ejecting head 13 in the −Z direction. Since the mounting portion 20 to which the liquid storage portion 19 is mounted is positioned above the nozzle surface 13*b*, liquid can be easily pressurized and supplied to the liquid ejecting head 13.

The liquid ejecting apparatus 100C includes the liquid supply channel 21 that supplies liquid to the liquid ejecting head 13 and a pressure adjustment mechanism 24 provided at the liquid supply channel 21. The filter 25 that filters the liquid flowing into the pressure adjustment mechanism 24 and the filter 27 that filters the liquid flowing out from the pressure adjustment mechanism 24 are disposed at the liquid supply channel 21.

The liquid ejecting apparatus 100C includes the reservoir 71 that communicates with the liquid storage portion 19 and the liquid ejecting head 13 and is capable of temporarily storing the liquid flowing from the liquid storage portion 19. The reservoir 71 is disposed at a position higher than the nozzle surface 13*b* on which a nozzle 23 of the liquid ejecting head 13 is formed and is disposed at a position lower than the mounting portion 20. Accordingly, liquid can be pressurized and supplied to the liquid ejecting head 13 by the water head difference between the reservoir 71 and the nozzle 23. That is, liquid can be supplied to the liquid ejecting head 13 by the water head difference without depending on the driving power of a pressurizing mechanism or the like that pressurizes the liquid in the liquid storage portion 19, for example.

The displacement mechanism 14 includes the holding member 15 that holds the liquid ejecting head 13. The displacement mechanism 14 changes the posture of the liquid ejecting head 13 between a first posture indicated by a solid line in FIG. 15 and a second posture indicated by a two-dot chained line in FIG. 15 by causing the holding member 15 to pivot around the pivot shaft 16. The displacement mechanism 14 may include a mechanism that moves the liquid ejecting head 13 in the second posture state in the +Z direction. The liquid ejecting head 13 has a plurality of nozzles 23 that ejects liquid toward the paper S and the nozzle surface 13*b* on which the nozzles 23 are formed. In a case where the liquid ejecting head 13 ejects a plurality of different types of liquids, at least the nozzle 23, the liquid supply channel 21, and the pressure adjustment mechanism 24 are provided for respective types of liquids.

The first posture is, for example, a posture in which the nozzle surface 13*b* of the liquid ejecting head 13 is inclined with respect to horizontal, and the second posture is a posture in which the inclination of the nozzle surface 13*b* with respect to horizontal is smaller than that of the first posture. In the present embodiment, when the liquid ejecting head 13 is in the second posture, the nozzle surface 13*b* is horizontal. However, the nozzle surface 13*b* needs not to be horizontal, but may be closer to horizontal than the first posture. That is, "the inclination of the nozzle surface 13*b* with respect to horizontal is smaller than that of the first posture" includes a case where the inclination of the nozzle surface 13*b* with respect to horizontal is zero and the nozzle surface 13*b* is horizontal.

The liquid ejecting head 13 performs recording by ejecting liquid as droplets onto the paper S supported by the medium support unit 18 disposed opposite to the nozzle surface 13*b* when the liquid ejecting head 13 is in the first posture. In the present embodiment, a direction in which the paper S advances on the medium support unit 18 is defined as a transport direction F, and a direction in which the liquid ejecting head 13 in the first posture ejects liquid is defined as an ejecting direction J. Further, a direction different from both the transport direction F and the ejecting direction J is defined as a width direction W. The liquid ejecting head 13 of the present embodiment constitutes a line head having a plurality of nozzles 23 arranged such that a printing range in the width direction W is greater than or equal to a width of the paper S.

Next, the configuration of the maintenance unit 31 will be illustrated.

The maintenance unit 31 includes the cap 33 that receives the liquid discharged from the nozzle 23 of the nozzle surface 13*b* in accordance with movement relative to the liquid ejecting head 13 and the suction mechanism 36 that sucks the inside of the cap 33. The suction mechanism 36 is coupled to the cap 33 and the waste liquid storage portion 37 via the suction flow path 35.

The maintenance unit 31 is disposed below the reservoir 71. Accordingly, liquid can be pressurized and supplied to the liquid ejecting head 13, and the maintenance of the liquid ejecting head 13 can be easily performed.

The maintenance unit 31 performs maintenance operations including capping and cleaning when the liquid ejecting head 13 is in the second posture. The capping is performed when the cap 33 is located below the liquid ejecting head 13. When the capping is performed, the liquid ejecting head 13 moves downward and forms a closed space between the cap 33 and the nozzle surface 13*b*. A position of the maintenance unit 31 when the capping is performed is referred to as a capping position. The capping is performed to prevent the nozzle 23 from drying when the liquid ejecting head 13 stops a liquid ejecting operation as well as when the power is off.

When performing suction cleaning which is one type of cleaning, first, the liquid ejecting head 13 is moved downward by the displacement mechanism 14 to perform capping. When the suction mechanism 36 is driven in a state in which the cap 33 forms a closed space between the cap 33 and the nozzle surface 13*b*, foreign objects such as bubbles located in the liquid ejecting head 13 are discharged from the nozzle 23 along with the liquid.

The cleaning is performed when the cap 33 is located below the liquid ejecting head 13. The cleaning is performed before a printing process starts or after the printing process is performed.

Further, the liquid ejecting head 13 performs a maintenance operation such as flushing for ejecting and discharging liquid, for example, when a slight ejection failure occurs. When the liquid ejecting head 13 is in the second posture, the moving mechanism 34 may perform the flushing by moving the maintenance unit 31 into a receiving position and receive the liquid discharged due to the flushing by the cap 33. In this case, it is preferable that the liquid ejecting head 13 is not moved downward and is disposed at a position away from the cap 33. Further, the liquid received by the cap 33 is stored in the waste liquid storage portion 37 by the driving of the suction mechanism 36.

A rib 18*a* that supports paper S and a concave receiving portion 18*b* that is disposed around the rib 18*a* may be provided in the medium support unit 18 to perform flushing toward the receiving portion 18*b* when there is no paper S on the medium support unit 18. In this case, the liquid ejecting head 13 performs flushing in the first posture.

Providing the receiving portion 18*b* in the medium support unit 18 enables the liquid ejecting head 13 to perform flushing in the first posture without changing the posture between the transport of paper S and transport of the next paper S, for example, when a printing process on a plurality of paper S is performed in succession. Therefore, the time necessary for the maintenance operation can be reduced compared to a case where the posture of the liquid ejecting head 13 is changed to the second posture in the middle of the printing process and flushing is performed toward the cap 33. The liquid received in the receiving portion 18*b* may be received in the waste liquid storage portion 37 through a waste liquid tube (not illustrated) or the like.

Next, the layout of the transport path R and the like of the liquid ejecting apparatus 100C will be described.

A first discharge port 80 that delivers the paper S on which the recording is performed by the liquid ejecting head 13 toward a bring-in port 226 of the media processing apparatus 200C is provided at the upper end portion of the housing 101 in the −Y direction. The first discharge port 80 has an opening portion provided in the housing 101. The paper S on which recording is performed is delivered to the bring-in port 226 of the media processing apparatus 200C through the opening portion. The first discharge port 80 is disposed above the mounting portion 20. Further, the second discharge port 85 is provided above the first discharge port 80 at the end portion of the housing 101 in the −Y direction. The second discharge port 85 has an opening portion provided in the housing 101. The paper S on which recording is performed is delivered to the bring-in port 226A of the media processing apparatus 200C through the opening portion.

The first transport path R1 which is a portion from a position corresponding to the liquid ejecting head 13 to the first discharge port 80 is formed in the transport path R. The first transport path R1 passes above the mounting portion 20 and is coupled to the first discharge port 80. A position corresponding to the liquid ejecting head 13 refers to a position where the transport path R faces the nozzle surface 13*b* when the liquid ejecting head 13 is in the first posture. In more detail, the first transport path R1 turns around the side of the mounting portion 20 in the +Y direction and passes through a position shifted from the mounting portion 20 in the −Z direction. That is, the first transport path R1 does not pass in the direction along the vertical of the mounting portion 20. In other words, the first transport path R1 does not pass through the area below the mounting portion 20 and vertically overlaps the mounting portion 20. Therefore, for example, even when the liquid from the mounting portion 20 drips, the possibility of the dripping liquid adhering to the paper S on which recording is performed is reduced. Accordingly, the degradation of image quality can be suppressed.

A branch path R5 branched from the middle of the first transport path R1 is coupled to the second discharge port 85. In detail, a branch point Pt is provided in the middle of the first transport path R1 above the mounting portion 20. The first transport path R1 is coupled to the first discharge port 80 while maintaining approximately the same height as that at which the branch point Pt is provided. That is, the height at which the branch point Pt is provided and the height of the first discharge port 80 are approximately the same. Further, the branch path R5 is formed upward from the branch point Pt. The branch path R5 passes above the first transport path R1. A flapper guide (not illustrated) is provided at the branch point Pt, and the transport direction of the paper S to the first transport path R1 or the branch path R5 is selected. Since the branch path R5 does not pass through the direction along the vertical of the mounting portion 20, like the first transport path R1, even when the liquid drips from the mounting portion 20, the risk of the dripping liquid adhering to the paper S after recording is reduced. Accordingly, the degradation of image quality can be suppressed.

The first transport path R1 and the branch path R5 are configured in common from the position corresponding to the liquid ejecting head 13 to the branch point Pt that branches from each other. Accordingly, a space for the transport path R can be saved.

Here, a unit transport path 90C in which the first discharge port 80, a first connecting path Rla of the first transport path R1 coupled to the first discharge port 80, the second discharge port 85, and the branch path R5 are integrated may be formed. The first connecting path Rla and the branch path R5 coupled to the first discharge port 80 of the unit transport path 90C are the upper portion of the mounting portion 20 and a portion including the branch point Pt. The unit transport path 90C is configured to be attachable and detachable to and from a portion Rlb of the first transport path R1 excluding the first connecting path Rla. Accordingly, by integrating a part of the first transport path R1 and the branch path R5 in the unit transport path 90C, the configuration of the transport path R in the liquid ejecting apparatus 100C can be simplified.

When the unit transport path 90C is removed from the housing 101, the paper S on which recording is performed by the liquid ejecting head 13 is discharged from downstream of the portion Rlb of the first transport path R1 to the outside. The discharged paper S is stacked at a portion that covers the upper portion of the mounting portion 20 of the housing 101. With this configuration, with only one liquid ejecting apparatus 100C, the use as the liquid ejecting apparatus 100C alone or the use as the recording system 1C can be switched.

In the +Y and −Y direction in FIG. 15 which is a width direction of the housing 101 in a side view of the housing 101, the first discharge port 80 is disposed on a first surface 101*a* side of the housing 101 facing the media processing apparatus 200C, that is, on the −Y direction side as one side from the center of +Y and the −Y direction which is the width direction of the housing 101, and the liquid ejecting head 13 performs recording on the paper S at a position close to a second surface 101*b* facing the first surface 101*a*, that is, on the +Y direction side as the other side from the center of +Y and the −Y direction in the width direction of the housing 101. That is, the position at which the liquid ejecting head 13 performs recording on the paper S in the first posture and the position of the first discharge port 80 are opposite to each other. Accordingly, the distance that the paper S on which recording is performed is transported to the first discharge port 80 becomes longer, so that the time for drying the liquid applied to the paper S can be set longer. Therefore, it is possible to suppress curling of the paper S caused by undried paper S and a defect such as transfer caused by liquid on the paper S.

As illustrated in FIG. 15, in a side view of the housing 101 from the −X direction, the mounting portion 20, the reservoir 71, and the maintenance unit 31 are vertically disposed in an area surrounded by the paper cassette 103 disposed on the first surface 101*a* side below the liquid ejecting head 13, a fourth transport path R4 of the transport path R from the paper cassette 103 disposed below the liquid ejecting head 13 to a position corresponding to the liquid ejecting head 13, the first transport path R1 coupled to the fourth transport path R4, and the first surface 101*a* of the housing 101. A position corresponding to the liquid ejecting head 13 refers to a position where the transport path R faces the nozzle surface 13*b* when the liquid ejecting head 13 is in the first posture. Accordingly, an effective layout of the housing 101 can be achieved, and a space can be saved. Furthermore, the waste liquid storage portion 37 is disposed at a position below the maintenance unit 31 in the above-described area and vertically overlaps at least a part of the maintenance unit 31. Accordingly, space efficiency can be further improved.

The fourth transport path R4 is formed upward from the paper cassette 103 toward the second surface 101*b*. That is, the fourth transport path R4 does not pass in the direction along the vertical of the mounting portion 20. In other words, the fourth transport path R4 does not pass through the area below the mounting portion 20 and vertically overlaps the mounting portion 20. Therefore, even when the liquid from the mounting portion 20 drips, the possibility of the dripping liquid adhering to the paper S before recording is performed is reduced. Accordingly, the degradation of image quality can be suppressed. The same applies to the liquid ejecting heads 100 to 100B according to the first to third embodiments.

A reversing path R6 is provided in the transport path R of the present embodiment. The reversing path R6 is a path that reverses the paper S on which recording has been performed on one side of the paper S by the liquid ejecting head 13 and transports the paper S toward the liquid ejecting head 13 again when performing duplex printing to record images on both sides of paper S.

A branch point that branches off from the reversing path R6 is provided downstream of the first transport path R1 from the liquid ejecting head 13. During duplex printing, the paper S on which printing is performed on one side is once transported to the downstream of the first transport path R1 by the forward drive of the driving motor of the transport unit 17. Thereafter, the driving motor of the transport unit 17 is driven reversely to transport the paper S to the reversing path R6. The paper S is transported from the reversing path R6 to the first transporting path R1 corresponding to the liquid ejecting head 13 again in a reversed state. The paper S transported in the reversed state is transported such that the opposite surface on which no image or the like is printed faces the nozzle surface 13*b* of the liquid ejecting head 13. Accordingly, duplex printing can be performed by ejecting liquid from the liquid ejecting head 13 onto the paper S.

The reversing path R6 is formed so as to bypass the second surface 101*b* side with respect to the medium support unit 18. That is, the reversing path R6 is formed in a direction away from the mounting portion 20. Therefore, the reversing path R6 does not pass through the direction along the vertical of the mounting portion 20, that is, the area below the mounting portion 20 and overlaps the mounting portion 20 vertically, so that the possibility of the dripping liquid adhering to the paper S on which recording is performed is reduced even when the liquid drips from the mounting portion 20. Accordingly, the degradation of image quality can be suppressed. It is preferable to provide the reversing path R6 with the same layout as that of the present embodiment also in the liquid ejecting apparatuses 100 to 100B of the first to third embodiments.

The waste liquid storage portion 37 can be attached and detached in a state in which the cover 104 (FIG. 1) is opened. The cover 104 is provided on a surface intersecting with a surface on which the first discharge port 80 is formed in the housing 101. That is, in FIG. 15, the first discharge port 80 is provided on the first surface 101*a* which is a surface of the housing 101 in the −Y direction, and the cover 104 is provided on a surface of the housing 101 intersecting with the first surface 101*a* in the −X direction. The waste liquid storage portion 37 is held on a guide in the housing 101, and can be removed from the inside of the housing 101 to the outside by pulling out the waste liquid storage portion 37 in the −X direction. Therefore, the waste liquid storage portion 37 can be easily accessed by opening the cover 104, and the convenience for the user is improved. Furthermore, in the present embodiment, the cover 104 is provided on the surface of the housing 101 in the −X direction, so that the waste liquid storage portion 37 can be easily replaced even when the media processing apparatus 200C is arranged in parallel with the liquid ejecting apparatus 100C.

A liquid receiving portion 72 that can receive liquid is provided below the mounting portion 20, the reservoir 71, or the maintenance unit 31. In the present embodiment, the liquid receiving portion 72 is provided below the reservoir 71. The liquid receiving portion 72 has a plate shape and is disposed approximately horizontally. Accordingly, the liquid dripping from the reservoir 71 can be received reliably. Further, the liquid receiving portion 72 and the waste liquid storage portion 37 are coupled by a waste liquid flow path 39. The liquid received in the liquid receiving portion 72 flows to the waste liquid storage portion 37 through the waste liquid flow path 39. Accordingly, when liquid from the mounting portion 20 or the reservoir 71 leaks, it is possible to make the leaking liquid reliably flow into the waste liquid storage portion 37. The liquid receiving portion 72 may be disposed below each of the mounting portion 20, the reservoir 71, and the maintenance unit 31. Further, the disposal position of the liquid receiving portion 72 may appropriately be set.

A detection unit 73 that detects the liquid received in the liquid receiving portion 72 is disposed. The detection unit 73 of the present embodiment is provided on the liquid receiving portion 72. The detection unit 73 is electrically coupled to the control unit 2. The detection unit 73 has a pair of electrode terminals, and the pair of electrode terminals is disposed on the liquid receiving portion 72. When liquid adheres between the pair of electrode terminals, the electrical resistance between the electrode terminals changes according to the amount of the adhering liquid. The liquid received in the liquid receiving portion 72 can be detected based on the change in the electrical resistance. Information detected by the detection unit 73 is notified by the operation unit 102. Accordingly, liquid leakage or dripping from the mounting portion 20, the reservoir 71, or the maintenance unit 31 can be detected at an early stage. The detection unit 73 may be singular or plural. It is preferable to provide a detection unit 73 similar to the present embodiment also in the liquid receiving portion 72 of the first to third embodiments.

As described above, according to the transport path R according to the liquid ejecting apparatus 100C, all paths along which paper S can be transported, that is, the first transport path R1, the branch path R5, the fourth transport path R4, and the reversing path R6 are provided at positions that do not pass through an area overlapping in the direction along the vertical direction of the area where the mounting portion 20 is provided. In other words, all the paths through which the paper S can be transported does not pass through the area below the mounting portion 20 and vertically overlaps the mounting portion 20. Accordingly, even when the liquid from the mounting portion 20 drips, the possibility of the dripping liquid adhering to the paper S is reduced, and thereby the degradation of image quality can be suppressed.

All the paths according to the present embodiment are provided at positions that do not pass through an area overlapping in the direction along the vertical direction of the area where the reservoir 71 is provided. Accordingly, for example, when the reservoir 71 has an open-air configuration, the possibility of the dripping liquid adhering to the paper S is reduced, and thereby the degradation of image quality can be suppressed even when the liquid drips from the open-air portion of the reservoir 71.

All the paths according to the present embodiment are provided at positions that do not pass through an area overlapping in the direction along the vertical direction of the area where the liquid receiving portion 72 is provided. Accordingly, even when the liquid received in the liquid receiving portion 72 drips from the liquid receiving portion 72, the possibility of the dripping liquid adhering to the paper S is reduced, and thereby the degradation of image quality can be suppressed.

In the present embodiment, recording is performed when the liquid ejecting head 13 is in the first posture. That is, recording is performed in a posture in which the nozzle surface 13*b* of the liquid ejecting head 13 is inclined with respect to the horizontal. Therefore, the fourth transport path R4 that feeds paper from the paper cassette 103 toward the liquid ejecting head 13 is formed obliquely upward with respect to the horizontal. Here, for example, when the nozzle surface 13*b* of the liquid ejecting head 13 is configured to perform recording in a horizontal posture, the fourth transport path R4 that feeds the paper from the paper cassette 103 toward the liquid ejecting head 13 needs to be routed so as to be horizontal, like the nozzle surface 13*b*. In such a configuration, as the path length of the fourth transport path becomes relatively long, the fourth transport path R4 needs to pass through the lower area of the mounting portion 20 in the layout. When the liquid drips from the mounting portion 20, there is a possibility that the dripping liquid adheres to the paper S. One the other hand, according to the present embodiment, the fourth transport path R4 is linearly formed from the paper cassette 103 toward the liquid ejecting head 13 disposed above. Therefore, compared to the configuration in which recording is performed in a state in which the nozzle surface 13*b* of the liquid ejecting head 13 is in a horizontal posture, the length of the fourth transport path R4 for feeding paper from the liquid ejecting head 13 to the paper cassette 103 can be further shortened, and the throughput can be improved. Furthermore, since the fourth transport path R4 does not pass through the area below the mounting portion 20, the risk of the dripping liquid adhering to the paper S when the liquid drips from the mounting portion 20 is reduced.

In the present embodiment, the mounting portion 20, the reservoir 71, and the maintenance unit 31 are vertically disposed in an area surrounded by the paper cassette 103, the fourth transport path R4, the first transport path R1 coupled to the fourth transport path R4, and the first surface 101*a* of the housing 101. Here, for example, when the mounting portion 20 and the maintenance unit 31 are disposed in a direction intersecting with the direction along the vertical direction, the housing 101 becomes large in the horizontal width direction, and the installation area of the liquid ejecting apparatus 100C becomes relatively large. On the other hand, according to the present embodiment, since each part is vertically and has a vertically long structure, an installation area can be made smaller.

The configuration and layout of the liquid ejecting apparatus 100C described in the present embodiment can also be applied to the liquid ejecting apparatuses 100 to 100B of the first to third embodiments. Furthermore, the effects obtained thereby are the same as in the present embodiment.

Figure 16:
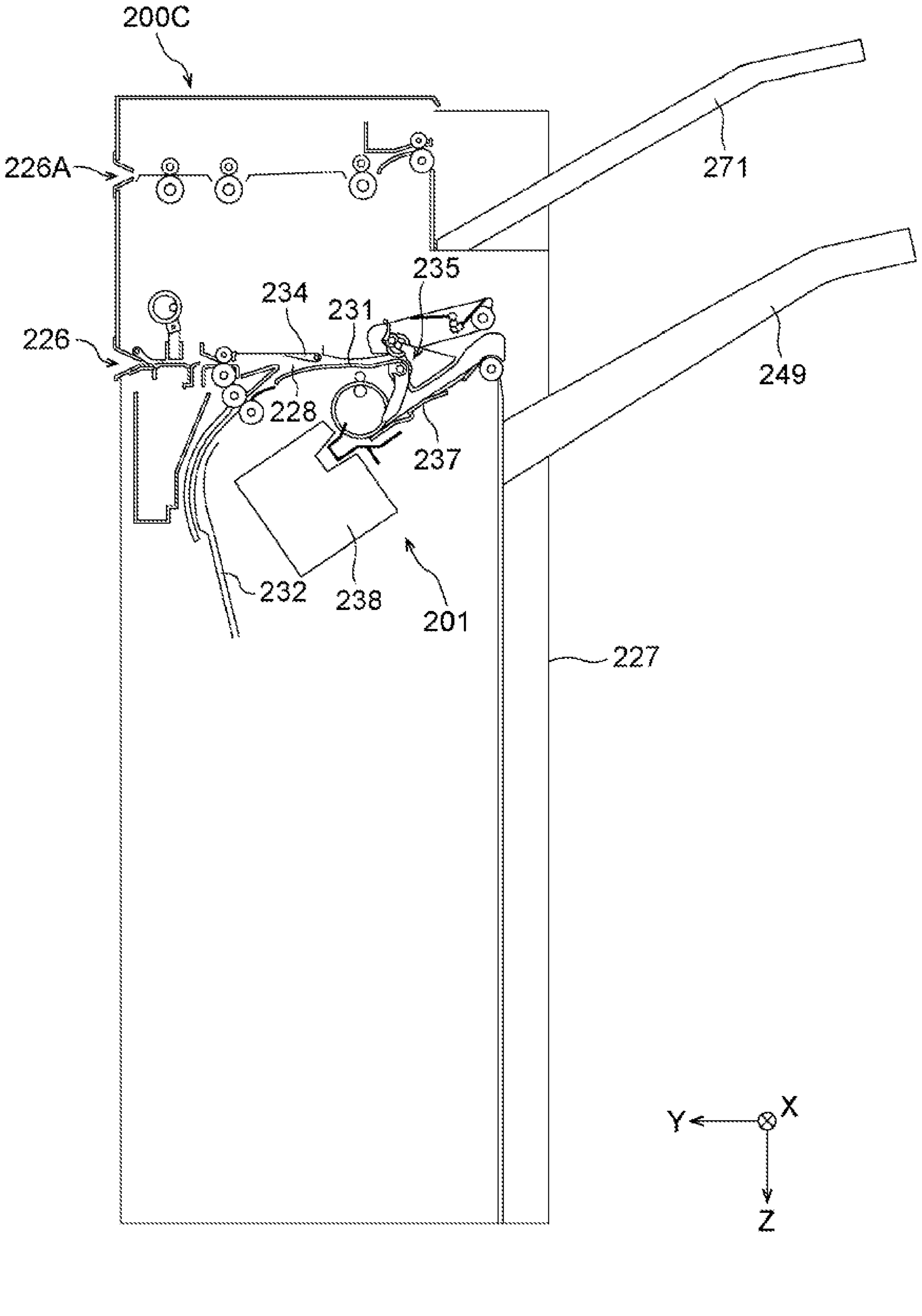
FIG. 16 is a schematic view illustrating the configuration of a media processing apparatus according to the fourth embodiment.

Next, the configuration of the media processing apparatus 200C will be described. FIG. 16 is a schematic view illustrating the configuration of a media processing apparatus 200C.

The media processing apparatus 200C is an apparatus that processes the paper S transported from the liquid ejecting apparatus 100C on which an image is recorded. The media processing apparatus 200C is on the −Y direction side in the +Y direction and the −Y direction that are the width direction of the housing 101 of the liquid ejecting apparatus 100C that is on the first surface 101*a* side and is arranged in parallel on one side. The media processing apparatus 200C includes a housing 227 and a bring-in port 226 at a position corresponding to the first discharge port 80 of the liquid ejecting apparatus 100C. Further, a bring-in port 226A is disposed at a position corresponding to the second discharge port 85.

The media processing apparatus 200C includes the second tray 271 as a first stacking portion that stacks the paper S delivered from the second discharge port 85, the first processing unit 201 that performs processing on the paper S delivered from the first discharge port 80, and the first tray 249 as a second stacking unit that stacks the paper S processed by the first processing unit 201. Accordingly, the configuration of the transport unit 17 of the liquid ejecting apparatus 100 can be simplified.

The media processing apparatus 200C includes a transport unit that can transport the paper S along the transport path between the bring-in port 226A and the second tray 271. The transport unit includes a plurality of transport rollers that are rotated by driving of a driving motor (not illustrated), a driven roller provided on each transport roller, a guide for guiding the paper S, and the like. The paper S introduced from the bring-in port 226A is transported along the transport path and stacked on the second tray 271.

The media processing apparatus 200C includes a paper bring-in path 228 through which the paper S from the bring-in port 226 is introduced, a first paper discharge path 231 and a second paper discharge path 232 that are branched downstream of the paper bring-in path 228, the path switching unit 234, and a transport unit that can transport a paper S. The transport unit includes a plurality of transport rollers that are rotated by driving of a driving motor (not illustrated), a driven roller provided on each transport roller, a guide for guiding the paper S, and the like.

The first paper discharge path 231 and the second paper discharge path 232 are disposed in communication such that the transport direction of the paper S once introduced into the first paper discharge path 231 can be reversed and the paper S can be switched back and transported to the second paper discharge path 232. The path switching unit 234 is constituted by a flapper guide that changes the transport direction of the paper S, and the mode can be switched between a mode to introduce paper S into the first paper discharge path 231 and a switchback transport mode for introducing the paper S introduced into the first paper discharge path 231 into the second paper discharge path 232 by a driving unit (not illustrated). In the paper bring-in path 228, a punch unit for punching a punch hole in the brought-in paper S is disposed.

The media processing apparatus 200C includes the first processing unit 201 that aligns and stacks the paper S sent from the first paper discharge path 231 and binds them. In addition to the housing 227, the first tray 249 on which paper S or a bundle of paper S that is processed and sent from the first processing unit 201 is stacked is disposed.

The first processing unit 201 includes a processing tray 237 for aligning and stacking paper S sent from a paper discharge port 235, and a stapler unit 238 for stapling a bundle of stacked paper S. The processing tray 237 is provided below the paper discharge port 235 of the first paper discharge path 231, switches back the transport direction of the paper S brought out from the paper discharge port 235, and the paper S is introduced onto the processing tray 237. The paper S is positioned at a predetermined binding position on the processing tray 237 by the positioning mechanism and is stapled by the stapler unit 238, and the bundle of bound paper S is brought out to the first tray 249 by a paper bundle bring-out mechanism.

As described above, according to the present embodiment, the following effects can be obtained.

In the liquid ejecting apparatus 100C and the recording system 1C, the first transport path R1 and the branch path R5 pass above the mounting portion 20. Accordingly, even when the liquid from the mounting portion 20 drips, the possibility of the dripping liquid adhering to the paper S on which recording is performed is reduced, and thereby the degradation of image quality can be suppressed. Further, since the mounting portion 20 is disposed at a position higher than the nozzle surface 13*b*, liquid can be easily pressurized and supplied to the liquid ejecting head 13.

5. Fifth Embodiment

Figure 17:
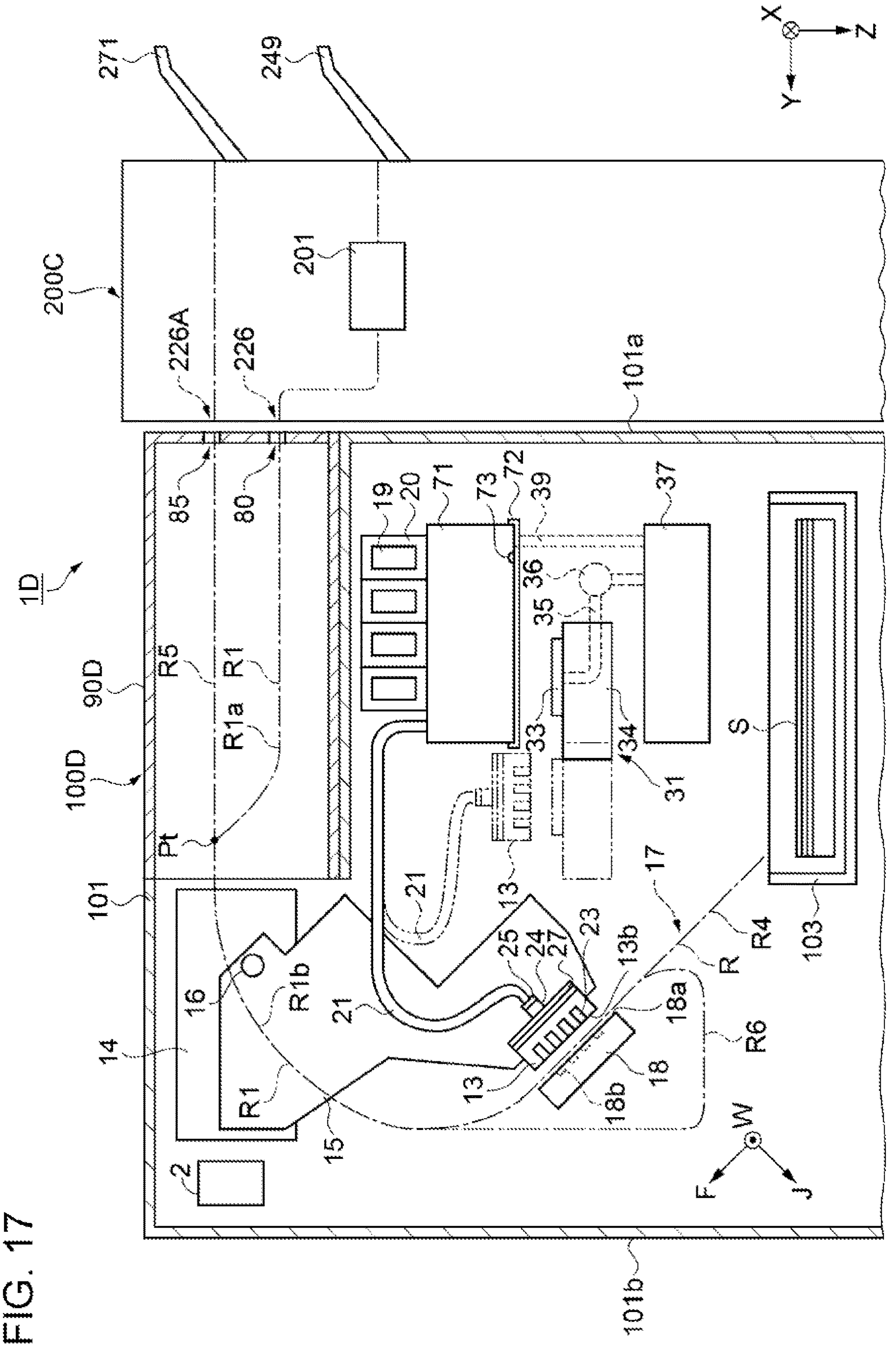
FIG. 17 is a schematic view illustrating the configuration of a recording system according to a fifth embodiment.

Next, a fifth embodiment will be described. FIG. 17 is a schematic view illustrating the configuration of a recording system 1D according to the present embodiment. As illustrated in FIG. 17, the recording system 1D includes a liquid ejecting apparatus 100D and the media processing apparatus 200C.

The present embodiment has the same configuration as the fourth embodiment except for the modes of the first transport path R1 and the branch path R5 of the liquid ejecting apparatus 100D. Therefore, parts different from the fourth embodiment will be mainly described, and description of parts similar to the configuration of the fourth embodiment will be omitted.

The transport path R of the liquid ejecting apparatus 100D includes the first transport path R1 from the position corresponding to the liquid ejecting head 13 to the first discharge port 80 and the branch path R5 that branches from the middle of the first transport path R1, passes above the first transport path R1, and is coupled to the second discharge port 85.

As illustrated in FIG. 17, a branch point Pt is provided in the middle of the first transport path R1 above the mounting portion 20. The first transport path R1 is coupled to the first discharge port 80 through a position lower than the height at which the branch point Pt is provided. That is, the position of the first discharge port 80 is lower than the height at which the branch point Pt is provided. Further, the branch path R5 is coupled to the second discharge port 85 while maintaining approximately the same height as that at which the branch point Pt is provided. That is, the height at which the branch point Pt is provided and the height of the second discharge port 85 are approximately the same. In this way, the branch path R5 passes above the first transport path R1.

The first transport path R1 and the branch path R5 are configured in common from the position corresponding to the liquid ejecting head 13 to the branch point Pt that branches from each other. Accordingly, a space for the transport path R can be saved.

A unit transport path 90D in which the first discharge port 80, a first connecting path R1*a* of the first transport path R1 coupled to the first discharge port 80, the second discharge port 85, and the branch path R5 are integrated may be formed. The first connecting path R1*a* and the branch path R5 coupled to the first discharge port 80 of the unit transport path 90D are the upper portion of the mounting portion 20 and a portion including the branch point Pt. The unit transport path 90D is configured to be attachable and detachable to and from a portion Rlb of the first transport path R1 excluding the first connecting path Rla. Accordingly, by integrating a part of the first transport path R1 and the branch path R5 in the unit transport path 90D, the configuration of the transport path R in the liquid ejecting apparatus 100D can be simplified.

As described above, according to the present embodiment, the following effects can be obtained.

Since the first transport path R1 and the branch path R5 do not pass through the direction along the vertical of the mounting portion 20 in the liquid ejecting apparatus 100D and the recording system 1D, even when the liquid drips from the mounting portion 20, the risk of the dripping liquid adhering to the paper S after recording is reduced. Accordingly, the degradation of image quality can be suppressed.

6. Sixth Embodiment

Figure 18:
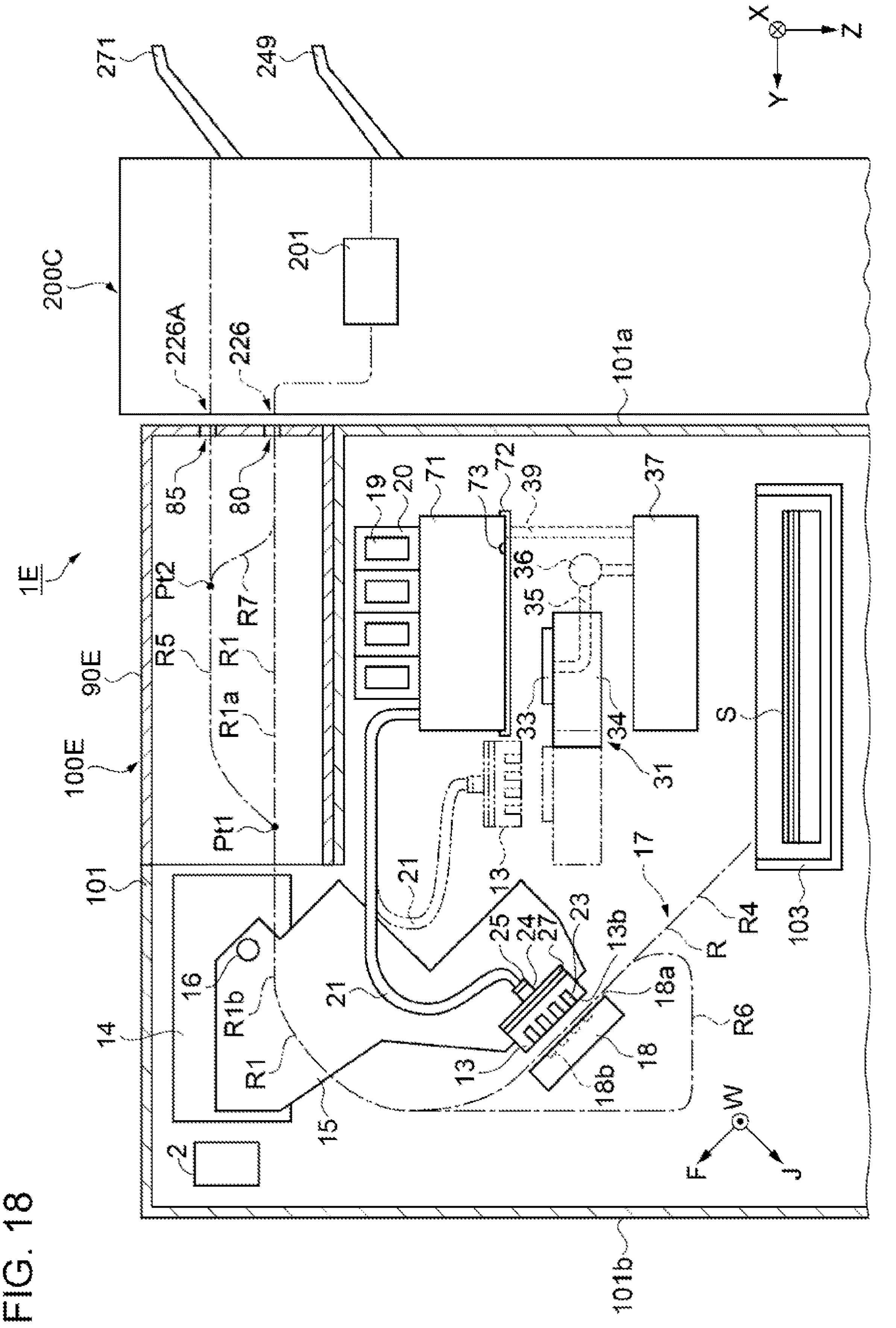
FIG. 18 is a schematic view illustrating the configuration of a recording system according to a sixth embodiment.

Next, a sixth embodiment will be described. FIG. 18 is a schematic view illustrating the configuration of a recording system lE according to the present embodiment. As illustrated in FIG. 18, the recording system lE includes a liquid ejecting apparatus 100E and the media processing apparatus 200C.

The present embodiment has the same configuration as the fourth embodiment except for the modes of the first transport path R1 and the branch path R5 of the liquid ejecting apparatus 100E and the like. Therefore, parts different from the fourth embodiment will be mainly described, and description of parts similar to the configuration of the fourth embodiment will be omitted.

The transport path R of the liquid ejecting apparatus 100E includes the first transport path R1 from the position corresponding to the liquid ejecting head 13 to the first discharge port 80, the branch path R5 that branches from the middle of the first transport path R1, passes above the first transport path R1, and is coupled to the second discharge port 85, and a merging path R7 that branches from the middle of branch path R5 and merges with the first transport path R1.

In detail, a first branch point Pt1 is provided in the middle of the first transport path R1 above the mounting portion 20. Then, the branch path R5 that passes above the first transport path R1 from the first branch point Pt1 is formed. Furthermore, a second branch point Pt2 is provided downstream of the first branch point Pt1 of the branch path R5 in the transport direction and in the middle of the branch path R5. Then, the merging path R7 that merges from the second branch point Pt2 to the lower first transport path R1 is provided. A flapper guide (not illustrated) is provided at the second branch point Pt2, and the transport direction of the paper S to the branch path R5 or the merging path R7 is selected.

Here, the branch path R5 from the first branch point Pt1 to the second branch point Pt2 and a path from the second branch point Pt2 to the merging path R7 that merges with the first transport path R1 function as a buffer path for waiting the paper S after recording. That is, when post-processing is performed on the paper S by the first processing unit 201 of the media processing apparatus 200C, a waiting time for waiting for the supply of the paper S from the liquid ejecting apparatus 100E to the media processing apparatus 200C is generated for a certain period in which post-processing is performed on a certain number of paper S in the first processing unit 201. At this time, the recorded paper S waits in the branch path R5 and the merging path R7, and when the media processing apparatus 200C can accept the paper S, the paper S waiting in the branch path R5 and the merging path R7 is transported from the first transport path R1 to the media processing apparatus 200C. In this way, throughput can be improved without stopping the printing process on the paper S by the liquid ejecting head 13.

The branch path R5 from the first branch point Pt1 to the second branch point Pt2 and a path from the second branch point Pt2 to the merging path R7 that merges with the first transport path R1 also function as a standby path for drying liquid applied to paper S after recording. For example, when the paper S coated with a relatively large amount of liquid or the paper S subjected to duplex printing is transported to the media processing apparatus 200C, due to the warp or curling of the paper S, a jam is likely to occur in the middle of transport, or the paper S stacked on the first tray 249 or the second tray 271 cannot be aligned. For this reason, before being transported to the media processing apparatus 200C, the liquid applied to the paper S is dried by waiting in the branch path R5 and the merging path R7, and transported to the media processing apparatus 200C in a state where the warp and curling of the paper S are suppressed so that it is possible to reduce a jam in the media processing apparatus 200C and align the paper S on the tray.

Since the first transport path R1, the branch path R5, and the merging path R7 do not pass the direction along the vertical of the mounting portion 20, the risk of the dripping liquid adhering to the paper S after recording is reduced even when the liquid drips from the mounting portion 20. Accordingly, the degradation of image quality can be suppressed.

A unit transport path 90E in which the first discharge port 80, a first connecting path R1*a* of the first transport path R1 coupled to the first discharge port 80, the second discharge port 85, the branch path R5, and the merging path R7 are integrated may be formed. The first connecting path Rla and the branch path R5 coupled to the first discharge port 80 of the unit transport path 90E are the upper portion of the mounting portion 20 and a portion including the first and second branch points Pt1 and Pt2. The unit transport path 90E is configured to be attachable and detachable to and from a portion Rlb of the first transport path R1 excluding the first connecting path R1*a*. Accordingly, by integrating a part of the first transport path R1, the branch path R5 in the unit transport path 90E, and the merging path R7, the configuration of the transport path R in the liquid ejecting apparatus 100E can be simplified.

As described above, according to the present embodiment, the following effects can be obtained in addition to the effects according to the above-described embodiments.

The liquid ejecting apparatus 100E and the recording system lE have a merging path R7 that branches from the middle of the branching path R5 and merges with the first transport path R1. Accordingly, the merging path R7 functions as a buffer path for waiting for the paper S after recording, and the throughput can be improved.

7. Modified Examples

The present disclosure is not limited to the above-described embodiment, and various modifications and improvements can be added to the above-described embodiment. Modified examples will be described below.

Modified Example 1

In the liquid ejecting apparatuses 100, 100A, 100B, 100C, 100D, and 100E, a heating unit that heats the paper S transported along the first transport path R1 may be provided in the transport path downstream of the liquid ejecting head 13. The heating unit may be configured so as not to come into contact with the paper S or may be configured to come into contact with the paper S. For example, a hot air generator that generates hot air may be disposed in the middle of the first transport path R1, or a heating roller may be applied to the transport roller pair provided in the first transport path R1. In this way, it is possible to suppress a defect such as curling or transfer caused by undried paper S discharged from the liquid ejecting apparatuses 100, 100A, 100B, 100C, 100D, and 100E. When transported from the liquid ejecting apparatuses 100, 100A, 100B, 100C, 100D, and 100E to the media processing apparatuses 200, 200A, 200B, and 200C, it is possible to suppress a defect such as curling or transfer caused by undried paper S in the media processing apparatuses 200, 200A, 200B, and 200C. Furthermore, since the heat from the heating unit can be released above the liquid ejecting head 13 by providing it in the transport path at the downstream of the liquid ejecting head 13, it is possible to suppress an increase in the viscosity of the liquid in the liquid ejecting head 13 and an increase in bubbles due to heat.

Modified Example 2

In the media processing apparatuses 200, 200A, 200B, and 200C, a heating unit that heats the paper S transported from the liquid ejecting apparatuses 100, 100A, 100B, 100C, 100D, and 100E may be provided. The heating unit may be configured so as not to come into contact with the paper S or may be configured to come into contact with the paper S. For example, a hot air generator for generating hot air may be disposed, or a heating roller may be applied. In this way, it is possible to suppress a defect such as curling or transfer caused by undried paper S.

Modified Example 3

A wiper may be provided in the maintenance unit 31. The wiper includes a wiping member that wipes the nozzle surface 13*b*. The wiping member is preferably composed of an elastically deformable plate member such as a rubber member or an elastomer, but it may be a cloth or a porous material that can absorb liquid, such as a nonwoven fabric. The wiper moves in the same direction as the moving direction of the cap 33 moved by the moving mechanism 34, and wipes the nozzle surface 13*b*. Accordingly, the drive mechanism of the cap 33 and the wiper can be simplified.

A configuration in which the wiper is moved in a direction intersecting the moving direction of the cap 33 may be employed. Separate wipers may be provided in the moving direction of the cap 33 and in the direction intersecting with the moving direction of the cap 33.

Modified Example 4

The number of paper cassettes 103 can be increased as appropriate. Thereby, the convenience can be improved.

Modified Example 5

In the liquid ejecting apparatuses 100, 100A, 100B, 100C, 100D, and 100E, it is preferable that an attachment portion for attaching the media processing apparatuses 200, 200A, 200B, and 200C is provided on the first surface 101*a* of the housing 101. The attachment portion may be configured to be installed in advance in the liquid ejecting apparatuses 100, 100A, 100B, 100C, 100D, and 100E, or may be configured to be detachably mounted from the housing 101. In this way, the liquid ejecting apparatuses 100, 100A, 100B, 100C, 100D, and 100E and the media processing apparatuses 200, 200A, 200B, and 200C can be easily attached, and the deviations between the liquid ejecting apparatuses 100, 100A, 100B, 100C, 100D, and 100E and the media processing apparatuses 200, 200A, 200B, and 200C can be suppressed.

Modified Example 6

The liquid ejecting apparatuses 100 and 100A are preferably provided with a flapper guide as a switching unit for switching the transport direction at a branch point between the first transport path R1 and the second transport path R2. In this way, switching between the first transport path R1 and the second transport path R2 can be performed reliably.

Modified Example 7

The media processing apparatuses 200, 200A, 200B, and 200C have been described by taking, as an example, a configuration in which the first processing unit 201 is provided to perform the binding process of the bundle of paper S and the process of punching punch holes, but the present disclosure is not limited to this. For example, the processing of the media processing apparatuses 200, 200A, 200B, and 200C may be processing for performing a half-fold on the bundle of paper S, processing for bookbinding the bundle of paper S, or the like. Further, a transport processing unit that transports the paper S may be included. For example, a process of offsetting the paper S by a predetermined amount in a direction orthogonal to the transport direction may be used. In this case, a tray for accumulating the paper S is disposed for each processing unit provided. In this way, it is possible to further improve convenience.

Modified Example 8

In the mounting portion 20 of the liquid ejecting apparatuses 100, 100A, 100B, 100C, 100D, and 100E, it is preferable to dispose the mounting portion 20 such that the portion where the largest volume liquid storage portion 19 is attached is closest to the inner wall surface of the housing 101 among the liquid storage portions 19 attached to the mounting portion 20, that is, so as to approach the first surface 101*a* in the above-described embodiments. In this way, the rigidity is increased as the portion to which the liquid storage portion 19 having the largest volume is mounted is disposed in the vicinity of the inner wall surface, and thereby, deformation of the mounting portion 20 can be suppressed.

Modified Example 9

In the liquid ejecting apparatuses 100, 100A, 100B, 100C, 100D, and 100E, a cover capable of exposing at least one of the medium support unit 18, the first transport path R1, and the reversing path R6 may be provided on the second surface 101*b* side of the housing 101. In this way, in addition to effects "suppression of undried medium by increasing the transport distance", "efficient layout of each component is possible in the housing 101" obtained by the above-described embodiments, it is also possible to obtain an effect that the paper S jammed in the medium support unit 18, the first transport path R1, and the reversing path R6 can be removed while the media processing apparatus is arranged in parallel with the liquid ejecting apparatus.

Modified Example 10

The media processing apparatuses 200, 200A, 200B, and 200C are not limited to post-processing apparatuses. The media processing apparatuses 200, 200A, 200B, and 200C may be an intermediate apparatus that performs a transport process for transporting the paper S delivered from the first discharge port 80 to the post-processing apparatus, or a heat treatment for the paper S delivered from the first discharge port 80 and then received by the post-processing device.

Modified Example 11

In the media processing apparatuses 200A and 200C, the processing unit 201 is disposed on the transport path between the bring-in port 226 and the first tray 249, but the present disclosure is not limited to this configuration. For example, the processing unit 201 may be disposed not on the transport path between the bring-in port 226 and the first tray 249 but on the transport path between the bring-in port 226A and the second tray 271. Furthermore, the processing unit 201 may be disposed not on the transport path between the bring-in port 226 and the first tray 249 but on the transport path between the bring-in port 226A and the second tray 271.

Modified Example 12

In the media processing apparatuses 200A and 200C, the paper S brought into the bring-in port 226A is stacked on the second tray 271 and the paper S brought into the bring-in port 226 is loaded onto the first tray 249, but the present disclosure is not limited to this. For example, the paper S brought into the bring-in port 226A may be stacked on the first tray 249, and the paper S brought into the bring-in port 226 may be stacked on the second tray 271.

Modified Example 13

In the present embodiment, the waste liquid flow path 39 for coupling the liquid receiving portion 72 and the waste liquid storage portion 37 is provided, but the configuration in which the waste liquid flow path 39 is omitted may be used. That is, only the liquid receiving portion 72 and the detection unit 73 may be configured. In this way, the configuration can be simplified.

Modified Example 14

When the detection unit 73 is disposed on the liquid receiving portion 72, a plurality of grooves coupled to the disposed detection unit 73 may be provided on the bottom surface of the liquid receiving portion 72. In this way, since the liquid received in the liquid receiving portion 72 flows toward the detection unit 73 due to the capillary force of the groove, it is possible to detect dripping or leakage of a small amount of liquid at an early stage.

An absorbent material that is partially in contact with the detection unit 73 may be provided on the bottom surface of the liquid receiving portion 72. The absorbent material is, for example, a nonwoven fabric. In this case, a configuration in which an absorbent material is spread over the entire bottom surface of the liquid receiving portion 72 or a configuration in which a strip-like or linear absorbent material is drawn around the bottom surface of the liquid receiving portion 72 may be used. It is preferable to provide a cover that covers the upper surface of the absorbent material. Accordingly, it is possible to prevent the liquid absorbed by the absorbent material from drying.

A metal material that is partially in contact with the detection unit 73 may be provided on the bottom surface of the liquid receiving portion 72. In this case, a configuration in which a metal material is spread over the entire bottom surface of the liquid receiving portion 72 or a configuration in which a strip-like or linear metal material is drawn around the bottom surface of the liquid receiving portion 72 may be used. In this way, dripping or leakage of liquid can be detected efficiently.

Modified Example 15

The branch path R5, the merging path R7, the branch point Pt, the first branch point Pt1, and the second branch point Pt2 may be provided in the media processing apparatus 200C instead of the liquid ejecting apparatuses 100C, 100D, and 100E. In this case, it is preferable to provide only the first transport path R1 in the liquid ejecting apparatuses 100C, 100D, and 100E or the unit transport paths 90C, 90D, and 90E. Even with such a configuration, it is possible to reduce the possibility that the liquid dripping from the mounting portion or the like adheres to the medium after recording, so that a reduction in image quality can be suppressed.

The contents derived from the embodiment will be described below.

The liquid ejecting apparatus includes a transport unit that transports a medium along a transport path, a liquid ejecting head that performs recording on the transported medium by ejecting liquid from a nozzle formed at a nozzle surface, a mounting portion on which a liquid storage portion that stores the liquid supplied to the liquid ejecting head is mounted, and a first discharge port for discharging the medium on which the recording is performed toward a media processing apparatus that performs processing on the medium, in which the mounting portion is disposed at a position higher than the nozzle surface, and the transport path has a first transport path provided from a position corresponding to the liquid ejecting head to the first discharge port, and the first transport path passes above the mounting portion.

According to this configuration, a portion of the first transport path from the position corresponding to the liquid ejecting head on the transport path to the first discharge port passes above the mounting portion. Accordingly, even when the liquid from the mounting portion drips, the possibility of the dripping liquid adhering to the medium on which recording is performed is reduced, and thereby the degradation of image quality can be suppressed. Further, since the mounting portion is disposed at a position higher than the nozzle surface, liquid can be easily pressurized and supplied to the liquid ejecting head.

The liquid ejecting apparatus may further include a second discharge port for discharging the medium on which the recording is performed, in which the second discharge port may be provided, above the first transport path, adjacent to the first transport path.

According to this configuration, even when the liquid from the mounting portion drips, the possibility of the liquid adhering to the medium on which recording is performed is reduced, and thereby the degradation of image quality can be suppressed.

The liquid ejecting apparatus may further include a medium receiving portion that receives the medium discharged from the second discharge port, in which the first transport path may pass between the medium receiving portion and the mounting portion.

According to this configuration, the first transport path is disposed between the medium receiving portion and the mounting portion, so that a space can be saved.

The liquid ejecting apparatus in which the first discharge port, and a first connecting path connected to the first discharge port among the first transport path are integrally formed as a unit transport path, in which the unit transport path may be configured to be attached to and detached from a portion of the first transport path excluding the first connecting path.

According to this configuration, the structure of the transport path in the liquid ejecting apparatus can be simplified by integrating the part of the transport system of the unit transport path.

The liquid ejecting apparatus may further include a second discharge port for discharging the medium on which the recording is performed toward the media processing apparatus, in which the transport path may have a third transport path provided from a position corresponding to the liquid ejecting head to the second discharge port, and the first transport path may pass between the third transport path and the mounting portion.

According to this configuration, the first transport path is disposed between the third transport path and the mounting portion, so that a space can be saved.

The liquid ejecting apparatus in which the first discharge port, a first connecting path connected to the first discharge port among the first transport path, the second discharge port, and a second connecting path connected to the second discharge port among the third transport path are integrally formed as a unit transport path, in which the unit transport path may be configured to be attached to and detached from a portion of the first transport path excluding the first connecting path and a portion of the third transport path excluding the second connecting path.

According to this configuration, the structure of the transport path in the liquid ejecting apparatus can be simplified by integrating the part of the transport system of the unit transport path.

The liquid ejecting apparatus may further include a second discharge port for discharging the medium on which the recording is performed toward the media processing apparatus, in which the transport path may have a branch path that branches from a middle of the first transport path and is connected to the second discharge port, and the first transport path and the branch path may pass above the mounting portion.

According to this configuration, the first transport path and the branch path pass above the mounting portion. Accordingly, even when the liquid from the mounting portion drips, the possibility of the dripping liquid adhering to the medium on which recording is performed is reduced, and thereby the degradation of image quality can be suppressed.

The liquid ejecting apparatus in which the first discharge port, a first connecting path connected to the first discharge port among the first transport path, the second discharge port, and the branch path are integrally formed as a unit transport path, in which the unit transport path may be configured to be attached to and detached from a portion of the first transport path excluding the first connecting path.

According to this configuration, the structure of the transport path in the liquid ejecting apparatus can be simplified by integrating the part of the transport system of the unit transport path.

The liquid ejecting apparatus may further include a housing that stores the liquid ejecting head and has a first surface and a second surface that face each other in a horizontal direction, in which the first discharge port may be provided at a position closer to the first surface than the second surface, and the liquid ejecting head may perform recording on the medium at a position closer to the second surface than the first surface.

According to this configuration, the recording position of the liquid ejecting head and the position of the first discharge port are opposite to each other. Accordingly, the distance that the recorded medium is transported to the first discharge port becomes longer, so that the time for drying the liquid applied to the medium can be set longer. Therefore, it is possible to suppress curling of the medium caused by undried medium and a defect such as transfer caused by liquid on the medium.

The liquid ejecting apparatus may further include a reservoir that communicates with the liquid storage portion and the liquid ejecting head, and is configured to store the liquid, in which the reservoir may be provided above the nozzle surface and is provided below the mounting portion.

Accordingly, liquid can be easily pressurized and supplied to the liquid ejecting head.

The liquid ejecting apparatus may further include a maintenance unit that performs maintenance of the liquid ejecting head, in which the maintenance unit may be disposed below the reservoir.

According to this configuration, maintenance of the liquid ejecting head can be easily performed.

The liquid ejecting apparatus may further include a medium storage portion that stores the medium, in which the medium storage portion may be disposed, at a position closer to the first surface than the second surface, below the liquid ejecting head, and the transport path has a fourth transport path provided from the medium storage portion to a position corresponding to the liquid ejecting head, and the mounting portion, the reservoir, and the maintenance unit may be vertically disposed in an area surrounded by the medium storage portion, the fourth transport path, the first transport path connected to the fourth transport path, and the first surface of the housing.

Accordingly, an effective layout in the housing can be achieved, and a space can be saved.

The liquid ejecting apparatus may further include a waste liquid storage portion configured to store the liquid discharged from the liquid ejecting head, and a cover configured to open and close a part of the housing, in which the waste liquid storage portion may be configured to be attached and detached in a state in which the cover is opened.

According to this configuration, the waste liquid storage portion can be easily replaced even when the liquid ejecting apparatus and the media processing apparatus are arranged parallel to each other.

The liquid ejecting apparatus may further include a waste liquid storage portion configured to store the liquid discharged from the liquid ejecting head, and a liquid receiving portion that is provided below the mounting portion, the reservoir, or the maintenance unit, and is configured to receive the liquid, and a waste liquid flow path that makes the liquid received in the liquid receiving portion flow into the waste liquid storage portion.

According to this configuration, the liquid leaked from the mounting portion, the reservoir, or the maintenance unit can reliably flow to the waste liquid storage portion.

The recording system includes a media processing apparatus that processes a medium, and a liquid ejecting apparatus including a transport unit that transports the medium along a transport path, a liquid ejecting head that performs recording on the transported medium by ejecting liquid from a nozzle formed at a nozzle surface, a mounting portion on which a liquid storage portion that stores the liquid supplied to the liquid ejecting head is mounted, and a first discharge port for discharging the medium on which the recording is performed toward the media processing apparatus, in which the mounting portion is disposed at a position higher than the nozzle surface, and the transport path has a first transport path provided from a position corresponding to the liquid ejecting head to the first discharge port, and the first transport path passes above the mounting portion.

According to this configuration, a portion of the first transport path from the position corresponding to the liquid ejecting head on the transport path to the first discharge port passes above the mounting portion. Accordingly, even when the liquid from the mounting portion drips, the possibility of the liquid adhering to the medium on which recording is performed is reduced, and thereby the degradation of image quality can be suppressed. Further, since the mounting portion is disposed at a position higher than the nozzle surface, liquid can be easily pressurized and supplied to the liquid ejecting head.

In the recording system, the liquid ejecting apparatus may further include a second discharge port for discharging the medium on which the recording is performed, and the second discharge port may be provided, above the first transport path, adjacent to the first transport path.

According to this configuration, even when the liquid from the mounting portion drips, the possibility of the liquid adhering to the medium on which recording is performed is reduced, and thereby the degradation of image quality can be suppressed.

In the recording system, the liquid ejecting apparatus may further include a medium receiving portion that receives the medium discharged from the second discharge port, and the first transport path may pass between the medium receiving portion and the mounting portion.

According to this configuration, the first transport path is disposed between the medium receiving portion and the mounting portion, so that a space can be saved.

In the recording system, the liquid ejection apparatus in which the first discharge port, and a first connecting path connected to the first discharge port among the first transport path are integrally formed as a unit transport path, and the unit transport path may be configured to be attached to and detached from a portion of the first transport path excluding the first connecting path.

According to this configuration, the structure of the transport path in the liquid ejecting apparatus can be simplified by integrating the part of the transport system of the unit transport path.

In the recording system, the liquid ejecting apparatus may further include a second discharge port for discharging the medium on which the recording is performed toward the media processing apparatus, in which the transport path may have a branch path that branches from a middle of the first transport path and is connected to the second discharge port, and the first transport path and the branch path may pass above the mounting portion.

According to this configuration, the first transport path and the branch path pass above the mounting portion. Accordingly, even when the liquid from the mounting portion drips, the possibility of the dripping liquid adhering to the medium on which recording is performed is reduced, and thereby the degradation of image quality can be suppressed.

In the recording system, the liquid ejecting apparatus may further include a housing that stores the liquid ejecting head and has a first surface and a second surface that face each other in a horizontal direction, the first discharge port may be provided at a position closer to the first surface than the second surface, and the liquid ejecting head may perform recording on the medium at a position closer to the second surface than the first surface.

According to this configuration, the recording position of the liquid ejecting head and the position of the first discharge port are opposite to each other. Accordingly, the distance that the recorded medium is transported to the first discharge port becomes longer, so that the time for drying the liquid applied to the medium can be set longer. Therefore, it is possible to suppress curling of the medium caused by undried medium and a defect such as transfer caused by liquid on the medium. Since the medium in which no curling or the like has occurred is transported to the media processing apparatus, the medium can be reliably processed.

What is claimed is:

1. A liquid ejecting apparatus comprising:

a transport unit that transports a medium along a transport path;

a liquid ejecting head that performs recording on the medium by ejecting liquid from a nozzle formed at a nozzle surface;

a mounting portion on which a liquid storage portion that stores the liquid supplied to the liquid ejecting head is mounted; and a processing unit that performs at least a transport process for the medium received from the transport unit, wherein the mounting portion is disposed at a position higher than the nozzle surface, and the processing unit is disposed above the mounting portion.

2. The liquid ejecting apparatus according to claim 1, further comprising:

the processing unit has a discharge port for discharging the medium on which the recording is performed, wherein the processing unit performs a discharge process of discharging the medium transported in the transport process through the discharge port.

3. The liquid ejecting apparatus according to claim 2, wherein the processing unit has a medium receiving portion that receives the medium discharged from the discharge port.

4. The liquid ejecting apparatus according to claim 1, wherein the processing unit is configured to be attached to and detached from the transport path.

5. The liquid ejecting apparatus according to claim 1, wherein the processing unit overlaps at least a portion of the mounting portion in the vertical direction when viewed from a direction intersecting the vertical direction.

6. The liquid ejecting apparatus according to claim 5, further comprising:

a reservoir that communicates with the liquid storage portion and the liquid ejecting head, and is configured to store the liquid, wherein the processing unit overlaps at least a portion of the reservoir in the vertical direction when viewed from the direction intersecting the vertical direction.

7. The liquid ejecting apparatus according to claim 6, further comprising:

a maintenance unit that performs maintenance of the liquid ejecting head, wherein the processing unit overlaps at least a portion of the maintenance unit in the vertical direction when viewed from the direction intersecting the vertical direction.

8. The liquid ejecting apparatus according to claim 7, further comprising:

a waste liquid storage portion configured to store the liquid discharged from the liquid ejecting head, wherein the processing unit overlaps at least a portion of the waste liquid storage portion in the vertical direction when viewed from the direction intersecting the vertical direction.

9. The liquid ejecting apparatus according to claim 8, further comprising:

a medium storage portion that stores the medium, wherein the processing unit overlaps at least a portion of the medium storage portion in the vertical direction when viewed from the direction intersecting the vertical direction.

10. The liquid ejecting apparatus according to claim 9, wherein the mounting portion, the reservoir, and the maintenance unit, the waste liquid storage portion, and the medium storage portion are vertically disposed.

11. The liquid ejecting apparatus according to claim 1, wherein the liquid ejecting head is configured to displace between a first posture that is inclined with respect to horizontal and a second posture along the horizontal, and the processing unit overlaps at least a portion of the liquid ejecting head in the second posture in the vertical direction when viewed from the direction intersecting the vertical direction.

* * * * *